(12) United States Patent
McCall et al.

(10) Patent No.: US 12,448,126 B2
(45) Date of Patent: Oct. 21, 2025

(54) UNMANNED VEHICLE RISK ASSESSMENT SYSTEM

(71) Applicant: AirDex, Inc., Fredericksburg, VA (US)

(72) Inventors: Micaela McCall, Albuquerque, NM (US); Boris Boiko, Baltimore, MD (US); Matthew Scott Drew, Alexandria, VA (US); John S. Eberhardt, III, Vienna, VA (US); Mitchell Horning, Reston, VA (US); James Hughes, Austin, TX (US); Eric Kucks, Annandale, VA (US); Cameron Peterson, Logan, UT (US); Zack Radeka, Reston, VA (US); Emily Richards, St. Charles, MO (US)

(73) Assignee: AirDex, Inc., Fredericksburg, VA (US)

( * ) Notice: Subject to any disclaimer, the term of this patent is extended or adjusted under 35 U.S.C. 154(b) by 197 days.

(21) Appl. No.: 17/947,549

(22) Filed: Sep. 19, 2022

(65) Prior Publication Data
US 2023/0150663 A1    May 18, 2023

Related U.S. Application Data

(60) Provisional application No. 63/280,852, filed on Nov. 18, 2021.

(51) Int. Cl.
*G01C 21/00* (2006.01)
*B64C 39/02* (2023.01)
*G01C 21/20* (2006.01)

(52) U.S. Cl.
CPC ............ *B64C 39/024* (2013.01); *G01C 21/20* (2013.01); *B64U 2201/104* (2023.01)

(58) Field of Classification Search
CPC .. B64C 39/024; G01C 21/20; B64U 2201/104
USPC .......................................................... 701/3
See application file for complete search history.

(56) References Cited

U.S. PATENT DOCUMENTS

| | | | |
|---|---|---|---|
| 8,190,353 B2 | 5/2012 | White et al. | |
| 9,540,118 B2 | 1/2017 | Rangan et al. | |
| 10,053,227 B2 | 8/2018 | Rangan et al. | |
| 10,354,536 B1 | 7/2019 | Hegranes et al. | |
| 10,647,443 B2 | 5/2020 | Rangan et al. | |
| 10,698,422 B2 | 6/2020 | Tuukkanen et al. | |
| 11,852,495 B1 * | 12/2023 | Sanchez | G01C 21/3461 |
| 2017/0309191 A1 | 10/2017 | Marcus | |
| 2018/0292835 A1 * | 10/2018 | Matus | G08G 1/096725 |

(Continued)

*Primary Examiner* — Tiffany P Young
(74) *Attorney, Agent, or Firm* — Pillsbury Winthrop Shaw Pittman LLP

(57) ABSTRACT

A method includes receiving a first navigation path risk request that includes first navigation path information associated with a first navigation path for a first unmanned vehicle through a first environment. The method also includes selecting a first risk model from a plurality of risk models based on the first navigation path information. The method also includes obtaining first data used as one or more inputs to run the first risk model from one or more data sources. The method also includes operating the first risk model with the first data to output a first risk score. The method also includes providing a first navigation path risk response in response to the first navigation path risk request that includes the first risk score that is associated with at least a portion of the first navigation path.

16 Claims, 15 Drawing Sheets

(56) References Cited

U.S. PATENT DOCUMENTS

2021/0325906 A1* 10/2021 White .................. G08G 5/0013
2022/0155796 A1* 5/2022 Haidar .................... H04W 4/40

* cited by examiner

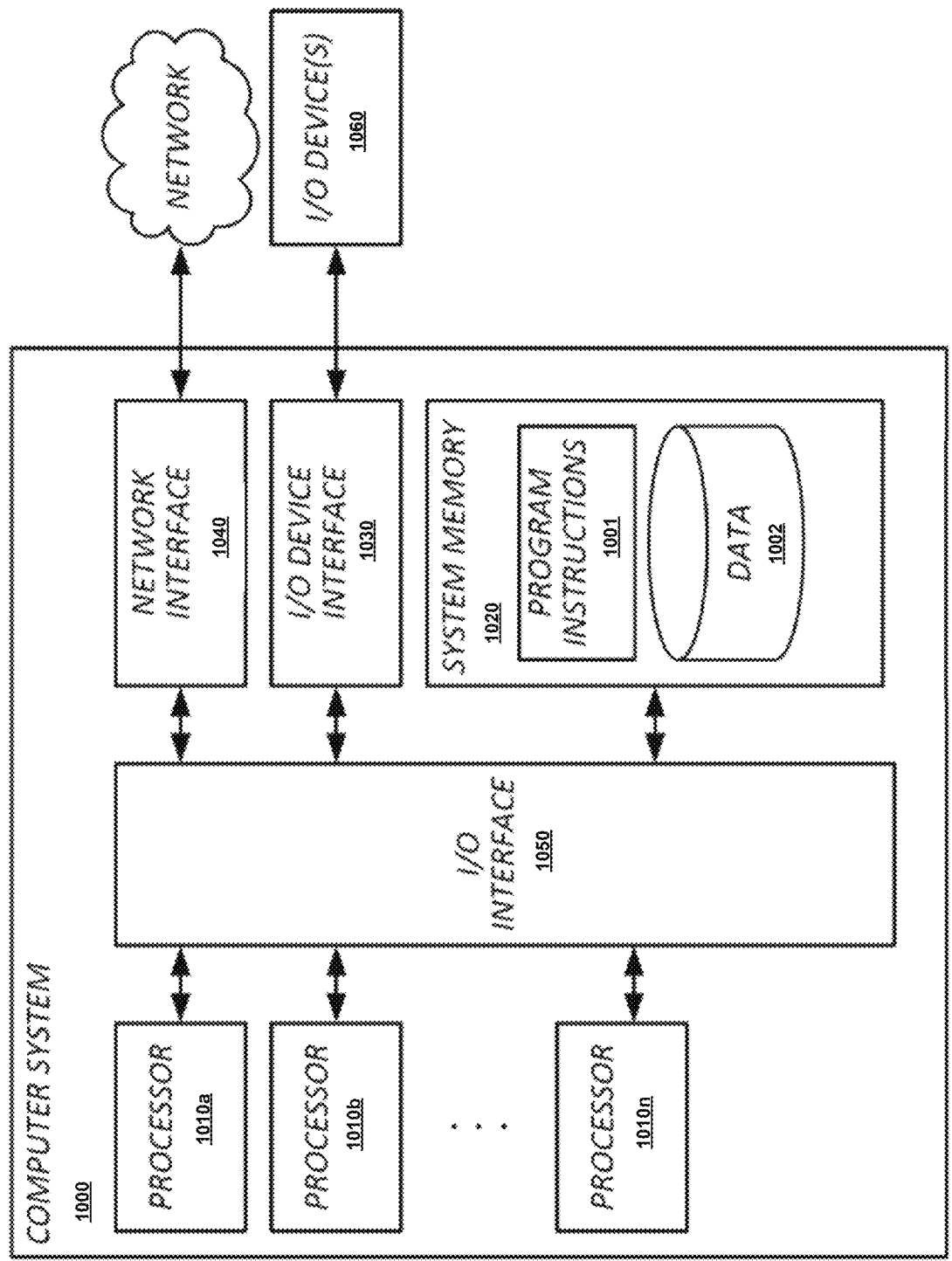

UNMANNED VEHICLE RISK ASSESSMENT SYSTEM

CROSS-REFERENCE TO RELATED APPLICATIONS

This patent claims the benefit of U.S. Provisional Patent Application 63/280,852, filed Nov. 18, 2021, titled "A Risk Based Trajectory Service for Unmanned Aerial Systems". The entire content of each afore-listed earlier-filed application is hereby incorporated by reference for all purposes.

GOVERNMENT LICENSE RIGHTS

This invention was made with government support under SBIR Contract 80NSSC21C0057 awarded by National Aeronautics and Space Administration (NASA) SBIR Phase I. The government has certain rights in the invention.

FIELD OF THE DISCLOSURE

This disclosure relates generally to unmanned vehicles, such as unmanned aerial vehicles, and, more particularly, to accessing risk for trajectory paths of unmanned vehicles.

BACKGROUND

Unmanned vehicles, such as unmanned aerial vehicles (UAVs) or unmanned ground vehicles (UGVs), are mobile platforms capable of acquiring (e.g., sensing) information, delivering goods, manipulating objects, etc., in many operating scenarios. Unmanned vehicles typically have the ability to travel to remote locations that are inaccessible to manned vehicles, locations that are dangerous to humans, or any other location. Upon reaching such locations, a suitably equipped unmanned vehicles may perform actions, such as acquiring sensor data (e.g., audio, images, video and/or other sensor data) at a target location, delivering goods (e.g., packages, medical supplies, food supplies, engineering materials, etc.) to the target location, manipulating objects (e.g., such as retrieving objects, operating equipment, repairing equipment etc.) at the target location, etc.

Unmanned vehicles are often controlled by a remote user from a command center (e.g., using a remote control, computer device, smart phone, and/or other remote monitor) such that the remote user provides commands to the unmanned vehicle through a wireless communications link to perform actions. More advanced unmanned are also being developed that are more autonomous (e.g., fully autonomous, semi-autonomous) such that unmanned vehicle guidance systems may assist the remote user or remove the need for the remote user altogether.

SUMMARY

The following is a non-exhaustive listing of some aspects of the present techniques. These and other aspects are described in the following disclosure.

Some aspects include a process including: receiving, by a computer system, a navigation path risk request that includes navigation path information associated with a navigation path for an unmanned vehicle through an environment; selecting, by the computer system, a risk model from a plurality of risk models based on the navigation path information; obtaining, by the computer system, data used as one or more inputs to run the risk model from one or more data sources; operating, by the computer system, the risk model with the data to output a risk metric; and providing, by the computer system, a navigation path risk response in response to the navigation path risk request that includes the risk metric that is associated with at least a portion of the navigation path.

Some aspects include a tangible, non-transitory, machine-readable medium storing instructions that when executed by a data processing apparatus cause the data processing apparatus to perform operations including the above-mentioned process.

Some aspects include an aircraft, including: one or more processors; and memory storing instructions that when executed by the processors cause the processors to effectuate operations of the above-mentioned process.

BRIEF DESCRIPTION OF THE DRAWINGS

FIG. 10 shows an example of a computing device by which the present techniques may be implemented, in accordance with some embodiments of the present disclosure.

Figure 1:
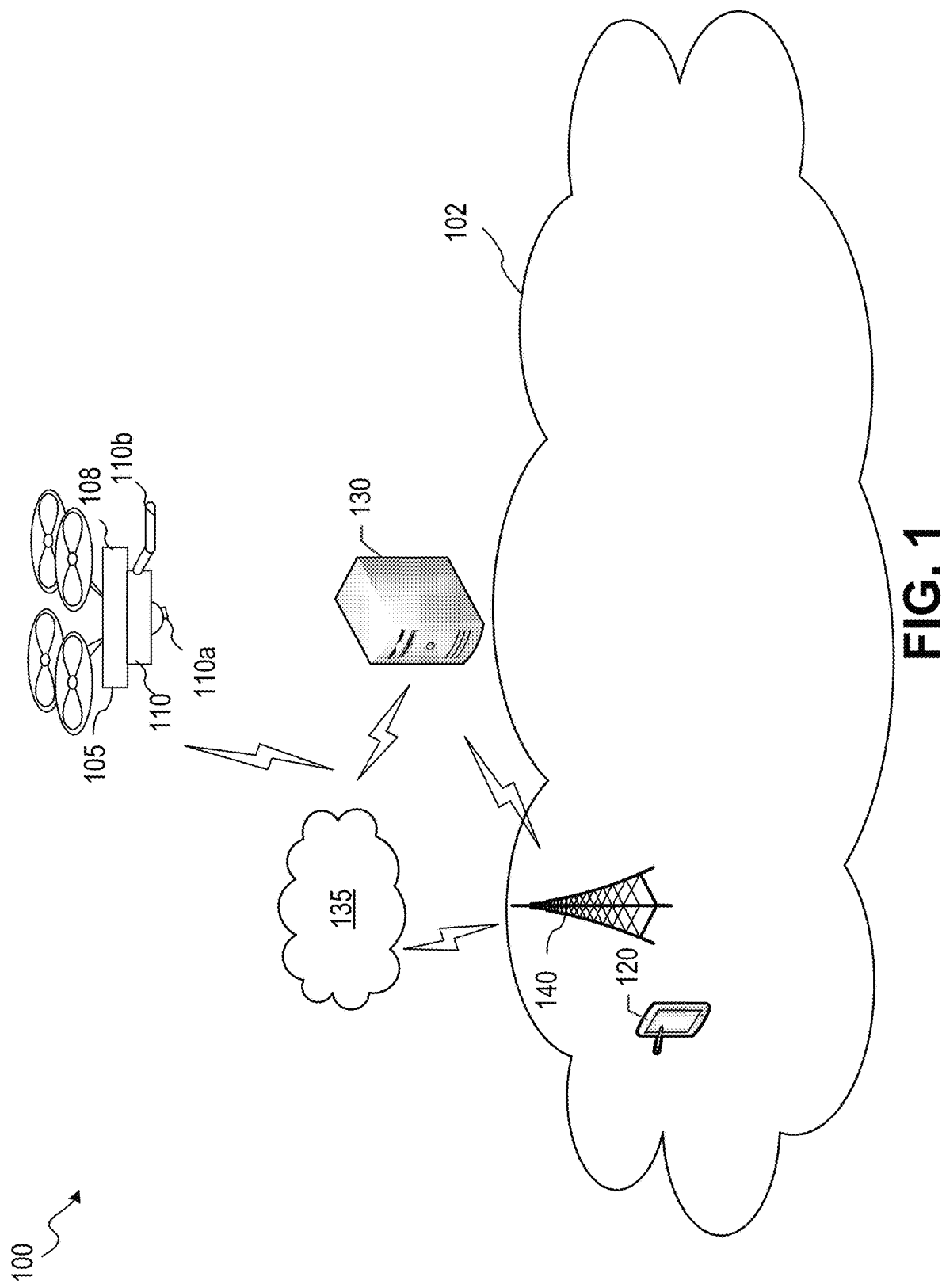
FIG. 1 is a schematic view illustrating an embodiment of an unmanned vehicle risk assessment system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the field of unmanned vehicle navigation. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Systems and methods of the present disclosure provide an unmanned vehicle risk assessment service platform that is a hosted service based on an application programming interface (API) that integrates multiple geospatial-geotemporal data sources with multiple risk models, providing real-time geospatial-geotemporal risk metrics that are then optimized into segment, risk-assessed trajectories or a set of defined geospatial-geotemporal points (e.g., one or more geospatial-geotemporal points) for optimization and used to provide instructions to an unmanned vehicle. The unmanned vehicle risk assessment service platform may be used in multiple ways. For example, a Risk Authority (e.g., the Federal Aviation Administration (FAA), an insurance company, or a state regulator) can use it to develop and publish formal, validated risk models. In another example, a Flight Manager (e.g., an operator, an air traffic service provider, or a regulator) may use the unmanned vehicle risk assessment service platform to assess the risk of a given flight or navigation path and risk-optimized trajectory. In another example, a Tools Developer (e.g., a provider of navigation planning, compliance, vehicles, or ground control software) can use the unmanned vehicle risk assessment service platform to integrate risk assessment and monitoring seamlessly into their end products as a white label service, allowing autonomous/semi-autonomous vehicles to make real-time context bound decisions for routing and re-routing for assured autonomy. The unmanned vehicle risk assessment service platform is, in some embodiments, expected to provide cross-platform, inter-model real time risk assessment and continuous risk monitoring as a broadly adoptable, integrated capability.

As the unmanned vehicle industry moves toward beyond visual line of sight (BVLOS) and autonomous capabilities, near real time (e.g., within 3 seconds or less, such as less than one second or less than a millisecond) risk assessment and continuous risk monitoring are going to be an aspect of the safety case and creating assured autonomy. While the FAA is developing standards and requirements for what the FAA will consider to be a "safe" BVLOS flight, the implementation of these guidelines is still being treated as a manual, offline activity: certification of vehicles, manuals, human flight planning, human-in the-loop risk management. While the unmanned vehicle industry is developing excellent technology, including advanced sensing, detect-and-avoid technologies, and autonomous flight routing the current path makes it likely that these systems will exist as components within the overall context of FAA or other regulatory body regulation. The ability to provide all of these systems with real time, continuous risk assessment and monitoring calculated using logical models derived from FAA standards, state and local regulations, and other experts has the potential to put all of these different systems on a "common baseline" that would allow for higher density operations and "common consensus" among the unmanned vehicles. This is especially relevant in creating the context for autonomous, BVLOS operations by creating boundary conditions for autonomous operations that recognize the changing contextual environment while also bounding autonomous vehicles in a manner that is consistent, clear, and automated.

The unmanned vehicle risk assessment system, in some embodiments having real time risk assessment and continuous risk monitoring using an open system, may be aligned with the "federated" model of unmanned aircraft systems (UAS) traffic management (UTM)/urban air mobility (UAM)/advanced aerial mobility (AAM) services.

The federated UTM/UAM/AAM model, in some embodiments, allows the system to grow and develop organically, within the guidelines and boundaries set by federal, state, and local government, with: i) a cost profile that works for state and local government; ii) the ability, in some embodiments, to make modest investments today that work for use cases now; iii) potentially improved safety because it, in some embodiments, allows for multiple participants to create redundant data and services coverage; and iv) the decentralized nature of a federated approach means it is less vulnerable to failure and attack because it doesn't have choke points (e.g., the original ARPAnet design).

The unmanned vehicle risk assessment system can, in some embodiments, provide risk assessment services in the federated model of UTM/UAM/AAM, and it, in some embodiments, is designed to do so by supporting multiple Risk Authorities owning and sharing models; provision of data by multiple sources; and open integration with UAS Service Supplier (USS)/UTM/Ground Control Software (GCS) tools.

The inventors of the present disclosure have demonstrated that the risk assessment/risk monitoring task of UAS and autonomous flight can be automated by translating safety standards into logical models and then demonstrate that these models could be applied in a federated systems context with multiple authorities contributing risk models, collecting and normalizing multiple disparate data sources, and creating a service that can be queried by multiple users using different USS/GCS tools. The top line result is that the unmanned vehicle risk assessment system, in some embodiments, is a product with demonstrated performance, such that it can: (1) acquire the data to validate and demonstrate the feasibility of the unmanned vehicle risk assessment system innovation based on the literature review; (2) provide two or more reference models for test and validation purposes based on the FAA Safety Management System Flight Risk Assessment Tools (FRATs) and the JARUS SORA report; (3) provide a Model Interpreter Service that hosts models, dynamically retrieves and normalizes data, and provides a near-real time risk assessment; (4) provide an API that returns a risk assessment segmented against the navigation path plan that supports risk mitigation and trajectory optimization; and (5) integrate the unmanned vehicle risk assessment system into an approved production FAA LAANC USS flight planning tool (e.g., Beeline) or other planning tools for ground and amphibious vehicles, allowing for testing and validation in a fully operational navigation planning environment that is pre-production for actual navigation testing, achieving technology readiness level (TRL)-4.

The systems and method of the present disclosure provides an API based production service that calculates risk based trajectories by integrating multiple geospatial-geotemporal data sources with independent risk models to provide real-time geospatial-geotemporal risk assessment and continuous risk monitoring using risk metrics that are then optimized into risk-optimized trajectories. The risk based trajectories, in some embodiments, may be used in UAS operations by human Remote Pilot in Command (RPIC), by autonomous vehicles in the Flight Planning and En Route phases of flight, and by managers of air traffic or local systems to make decisions about approving operations or opening/closing airspace and ground space. Features of the unmanned vehicle risk assessment system, in some embodiments, include but are not limited to: collecting disparate source data and normalizing for use in risk assessment and continuous risk monitoring; adding independent risk model content from independent Risk Authorities, risk models, and additional data sources; developing model specification and validation tools for use by Risk Authorities within the unmanned vehicle risk assessment service; supporting the federated UTM/UAM/AAM model by integrating with external USS/GCS/Flight Planning Tools; making the tool operational for remote pilot in command (RPIC) vehicles and autonomous vehicles to provide trajectory optimization modes; presenting risk trajectories through user interface design and reference implementations; subscribing to various data sources and Risk Authorities; and other features discussed below. In some embodiments, the unmanned vehicle risk assessment system provides a capability that significantly improves the safety of high density, crewed or uncrewed, piloted or autonomous vehicle operations in the National Airspace System (NAS).

In an example embodiment, industry has largely focused on the traffic management and operational aspects of UAS and other unmanned vehicle operations, with risk management largely being treated as either a manual, offline process, or a design issue for the airframe/vehicle chassis. The unmanned vehicle risk assessment system of the present disclosure, in some embodiments, seeks to address the lack of investment into risk management approaches for unmanned vehicle operations by creating a service to help unmanned vehicle operators manage the risk of their trajectory, in addition to other risk mitigation measures. The unmanned vehicle risk assessment service, in some embodiments, will include several components: access to substrate data for operator informational awareness and to perform and return risk calculations; a service hosting one or more risk calculation models that can leverage the data to calculate model-specific, geospatial-geotemporal risk estimates on the fly (with a "failure modes, effects, and criticality analysis" (FMECA) model as a baseline); a geospatial-geoptemporal zoning capability that uses input coordinates to identify applicable risk elements, calculate associated risk metrics, optimize the given trajectory into a series of "risk" segments, and map and return one or more optimized and/or preferred diversion routes; and an on-demand API that external consumers use to query the unmanned vehicle risk assessment service using entered flight plans other navigation plans and return a set of risk based trajectory segments or a set of defined geospatial-geotemporal points (e.g., one or more geospatial-geotemporal points).

The unmanned vehicle risk assessment system, in some embodiments, is an "open" service that leverages available data, Supplemental Data Service Providers (SDSPs), other Risk Authority specified sources of data, and provides open access to the API rather than requiring use of the service as part of a bundled UTM package. A component of the unmanned vehicle risk assessment service, in some embodiments, is to integrate with any authoritative SDSP or other specified data provider. By proving out the concept of state and local government as an authoritative provider of supplemental information, combined with other sources of public and commercially available data, the possibility for an automated, scalable, detailed risk-based trajectory service with national coverage is possible. Similar to the FAA SMS FRAT guidelines for traditional manned flight, the unmanned vehicle risk assessment system, in some embodiments, can expand the FRAT to an automated, near-real-time risk assessment and planning capability for both human controlled (Remote Pilot in Command) and autonomous (software controlled) UAS or other unmanned ground or amphibious vehicles.

The FAA Safety Management System and waiver process for beyond visual line of sight (BVLOS) and advanced operations use the same techniques (air space characterization and ground risk assessment) as the FRAT and are laborious and manual. Finally, the new FAA Operation of Small Unmanned Aircraft Systems Over People rule leaves a gap: while it accounts for UAS vehicle attributes and enhanced pilot training, it reduces the requirement for Remote Pilots in Command or operators of autonomous UAS to analyze and understand the risk factors of a given operation (as was required under the waiver process), abandoning the assessment component of the waiver process for Operations Over People. The unmanned vehicle risk assessment system, in some embodiments, addresses this gap and provides a readily available, scalable, quick solution for operational flight risk assessment consistent with the FAA SMS.

In the UAS sector, the investment and research has been focused on developing the fabric of UAS Traffic Management: surveillance, flight planning, flight scheduling, airspace management, regulatory compliance, and the onboard systems and sensors making UAS vehicle themselves more intelligent, more networked, and lower risk. However, there are some conventional approaches and solutions to managing UAS flight risk assessment: (1) FAA Waiver Process—while the waiver process now excludes Operations Over People and Operations at Night, the waiver process and its risk analysis and narrative are the predominant method for managing risk in advanced UAS operations; (2) Pilot Training—the baseline for risk management includes knowledge about procedures for airmen, control of a vehicle in flight, understanding of regulations, how to interpret airspace configuration, and navigation principles. Pilot training and certification help UAS RPICs understand the risks associated with flight; however, it does not provide the level of situational awareness that integrated data can. Further, autonomous vehicles do not benefit from this training; (3) FAA SMS FRAT—can be applied to UAS operations, and some organizations have created checklists and training tools to help RPICs apply the SMS FRAT approach to UAS. The unmanned vehicle risk assessment service of the present disclosure incorporates the FRAT components as well as other data to provide the same rigor in an automated service that also benefit autonomous vehicles; and (4) Commercial Software Products—Flight Planning products provide information about infrastructure, airports, and areas where operations have a higher risk relative to manned aviation. However, while this provides useful situational awareness, it is not fully integrated and still puts the onus on the pilot to formulate a risk assessment.

The unmanned vehicle risk assessment system and methods, in some embodiments, at the end of Phase II follows several core design principles to implement the open service architecture concept of some embodiments of risk based trajectory. The first was to develop a solution architecture and design around "personas" that represent the users and stakeholders in the system. The second was to make the system as configurable as possible, by allowing "swappable"

models (the ability to onboard and use multiple data sets). The third was to develop an API that supports the submission of route/navigation plans (e.g., flight plans) using standard objects to request specific outputs, and to return these outputs in as standard and simple a format as possible. Fourth was to use loosely coupled interfaces to support future integrations with external systems. The result was a set of user personas, an overall system design, and a set of functionally integrated, tested, and validated modules.

User personas identified in the Phase I research include, in some embodiments, the Risk Authority, the Flight Manager, and the Tools Developer. The Risk Authority, in some embodiments, is a trusted, independent expert on aviation risk. The authority may be an individual expert, such as a researcher, or a trusted organization such as a regulator, university, or insurance company. The Risk Authority is, in some embodiments, responsible for creating, curating, and validating models. The Flight Manager is, in some embodiments, a remote pilot in command, an operator, or a stakeholder such as a regulator, insurer, or community that has a vested interest in the safety of UAS operations. The Flight Manager, in some embodiments, is the consumer of risk assessment services and engages directly in risk mitigation activities. The Tools Developer is a provider of equipment and software to the UAS industry, such as an OEM, USS, UTM provider, or developer of flight planning and ground control software.

The solution architecture includes, in some embodiments, four groups: the system users/consumers, the constituent data sources, the model tracking and management server, and the Model Interpreter Service. As described in further detail below, the Risk Authority, in some embodiments, interacts with the API on the Model Interpreter Service to specify and submit a model which is then managed by the model tracking and management server (e.g., MLFlow Tracking Server) or a model hosting service and rendered available for loading when a risk assessment against a specific flight plan/route plan is requested.

The Flight Manager, in some embodiments, (e.g., Operator) or Tools Developer (e.g., OEM) submits a flight plan with model specification as a geoJSON attribute (or other suitable format, such as KML or XML) against the Model Interpreter Service API. The request is, in some embodiments, handled in the Risk Assessment module, which loads the risk model (e.g., in real-time) from the Model Hosting module which specification is then used to forward a contextual data request to the Geospatial Data Aggregation module. The Geospatial Data Aggregation, in some embodiments, formulates the individual data request queries to the distributed data services and normalizes the returned data (e.g., in real time) before passing it back to the Risk Assessment module. The Risk Assessment module, in some embodiments, calculates the geospatial-geotemporal risk assessment for the proposed operation and then passes the risk topology back to the Model Interpreter Service API. The API, in some embodiments, segments and packages the risk assessed, segmented operation and returns it to the Flight Manager or Tools developer as a geoJSON (or other suitable format, such as KML or XML).

In addition to the unmanned risk assessment system's modular architecture, in some embodiments, architecture activities include development of the model specification. This describes the reference JSON schema for how a "swappable" risk model would be specified by the user, design criteria for the model interpreter service, and a Logical Architecture for the prototype.

Referring now to FIG. 1, an embodiment of an unmanned vehicle risk assessment system 100 is illustrated. In the illustrated embodiment, the unmanned vehicle risk assessment system 100 includes an unmanned vehicle 105 provided in an environment 102. The environment 102 may be any indoor or outdoor space that may be contiguous or non-contiguous. The environment 102 may be defined by geofencing techniques that may include specific geographic coordinates such as latitude, longitude, or altitude, or operate within a range defined by a wireless communication signal, during a specified or defined window of time.

The unmanned vehicle 105 may be implemented by any type of drone, such as an unmanned aerial vehicle (UAV). In alternative embodiments, a robot, an unmanned ground vehicle (e.g., a car, a truck, a tractor, military equipment, construction equipment, etc.), an unmanned amphibious vehicle (e.g., a boat, a submersible, a hovercraft, etc.), or other vehicular devices may be employed. In the illustrated examples of the present disclosure, the unmanned vehicle 105 is depicted as a UAV and may include a flight control unit 108 and a payload unit 110. For example, the flight control unit 108 of the unmanned vehicle 105 may include any appropriate avionics, control actuators, or other equipment to fly the UAV. The payload unit 110 of the unmanned vehicle 105 may include any equipment implementing features supported by the given UAV. For example, the payload unit 110 may include one or more sensors, such as one or more cameras or other imaging sensors 110a, one or more environmental sensors (e.g., such as one or more temperature sensors, pressure sensors, humidity sensors, gas sensors, altitude sensors, location sensors and the like) or any other sensor. Additionally or alternatively, an example payload unit 110 for the unmanned vehicle 105 may include tools, actuators, manipulators, etc., capable of manipulating (e.g., touching, grasping, delivering, measuring, etc.) objects. For example, as illustrated in FIG. 1, the UAV may include a robotic arm 110b that is configured to deploy the one or more sensors include on the robotic arm 110b. Additionally or alternatively, an example payload unit 110 for the unmanned vehicle 105 may include a portable base station, signal booster, signal repeater, etc., to provide network coverage to an area. Additionally or alternatively, the robotic arm 110b may operate a mechanism for delivery of goods to a recipient on the ground in the defined geospatial area 102.

The unmanned vehicle 105 may include communication units having one or more transceivers to enable the unmanned vehicle 105 to communicate with a remote monitor 120, a service platform 125 via a communication network 135, or any other computing devices (e.g., other unmanned vehicles, sensors, a docking station, etc.) in the environment 102 that would be apparent to one of skill in the art in possession of the present disclosure. Accordingly, and as disclosed in further detail below, the remote monitor 120 may be in communication with the unmanned vehicle 105 directly or indirectly. As used herein, the phrase "in communication," including variances thereof, encompasses direct communication or indirect communication through one or more intermediary components and does not require direct physical (e.g., wired or wireless) communication or constant communication, but rather additionally includes selective communication at periodic or aperiodic intervals, as well as one-time events.

For example, the unmanned vehicle 105 in the unmanned vehicle risk assessment system 100 of FIG. 1 include first (e.g., long-range) transceiver(s) to permit the unmanned vehicle 105 to communicate with the communication network 135. The communication network 135 may be implemented by an example mobile cellular network such as a radio access network (RAN) that includes a core network and one or more base stations 140. As such, the RAN may include a long-term evolution (LTE) network or other third generation (3G), fourth generation (4G) wireless network, or fifth-generation (5G) wireless network. However, in some examples, the communication network 135 may be additionally or alternatively be implemented by one or more other communication networks, such as, but not limited to, a satellite communication network, a microwave radio network, or other communication networks.

The unmanned vehicle 105 additionally or alternatively may include second (e.g., short-range) transceiver(s) to permit the unmanned vehicle 105 to communicate with sensors, docking stations, other unmanned vehicles, the remote monitor or other computing devices in the environment 102. In the illustrated example of FIG. 1, such second transceivers are implemented by a type of transceiver supporting short-range wireless networking. For example, such second transceivers may be implemented by Wi-Fi transceivers, Bluetooth® transceivers, infrared (IR) transceiver, and other transceivers that are configured to allow the unmanned vehicle 105 to intercommunicate via an ad-hoc or other wireless network.

The unmanned vehicle risk assessment system 100 also includes or may be used in connection with a remote monitor 120. The remote monitor 120 may be provided by a desktop computing system, a laptop/notebook computing system, a tablet computing system, a mobile phone, a set-top box, a remote control, a wearable device, and implantable device, or other remote monitor for controlling the unmanned vehicle 105. However, in other embodiments, the unmanned vehicle 105 may be autonomous or semi-autonomous. The remote monitor 120 may be responsible for managing the unmanned vehicle 105 deployed in the environment 102. For example, the remote monitor 120 may communicate indirectly through the communication network 135 or directly to locate the unmanned vehicle 105 in the environment 102, identify the unmanned vehicle 105 in the environment 102, ascertain capabilities of the unmanned vehicle 105 in the environment 102, monitor the operating status of the unmanned vehicle 105 in the environment 102, receive sensor data provided by the unmanned vehicle 105 in the environment 102, provide instructions to the unmanned vehicle 105, or provide other functionality.

The unmanned vehicle risk assessment system 100 also includes or may be in connection with an unmanned vehicle risk assessment service platform 130. For example, the unmanned vehicle risk assessment service platform 130 may include one or more server devices, storage systems, cloud computing systems, or other computing devices (e.g., desktop computing device(s), laptop/notebook computing device (s), tablet computing device(s), mobile phone(s), etc.). As discussed in further detail below, the unmanned vehicle risk assessment service platform 130 may be configured to provide unmanned vehicle risk models, data for operating the risk models, or other instructions and data that would be apparent to one of skill in the art in possession of the present disclosure. The service platform may also include a services engine for communicating instruction and risk results to the unmanned vehicle 105. While a specific unmanned vehicle risk assessment system 100 is illustrated in FIG. 1, one of skill in the art in possession of the present disclosure will recognize that other components and configurations are possible, and thus will fall under the scope of the present disclosure. For example, the system may include many more unmanned vehicles (e.g., 2, 5, 10, 100, 1000, or more) or many other remote monitors (e.g., 2, 5, 10, 100, 1000, or more) in the environment 102 and the system may include many other separate environments 102.

Figure 2:
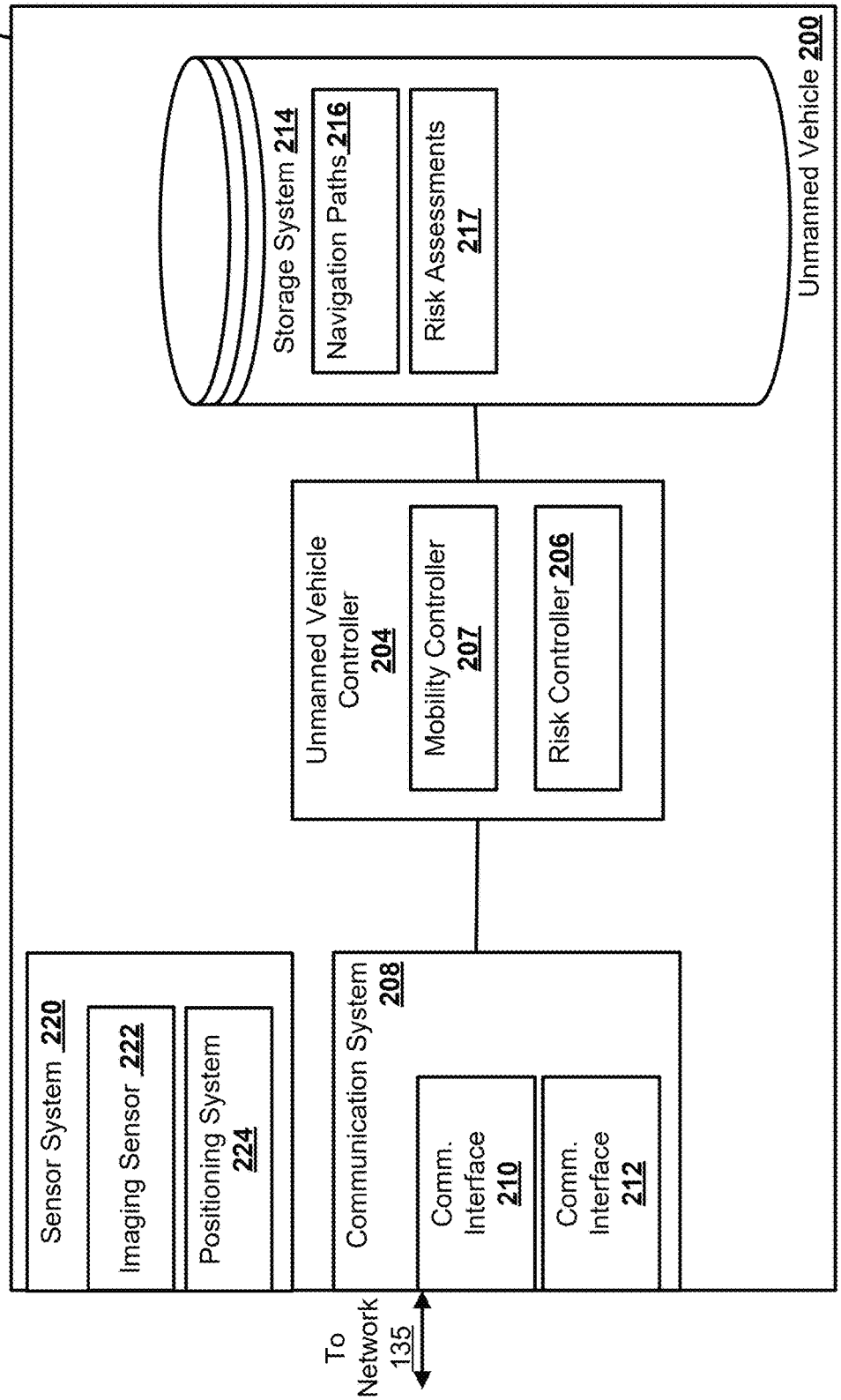
FIG. 2 is a schematic view illustrating an embodiment of an unmanned vehicle used in the unmanned vehicle risk assessment system of FIG. 1, in accordance with some embodiments of the present disclosure.

Referring now to FIG. 2, an embodiment of an unmanned vehicle 200 is illustrated that may be the unmanned vehicle 105 discussed above with reference to FIG. 1, and which may be provided by a UAV, a robot, an unmanned ground vehicle, an unmanned amphibious vehicle, or other unmanned vehicular device. In the illustrated embodiment, the unmanned vehicle 200 includes a chassis 202 that houses the components of the unmanned vehicle 200. Several of these components are illustrated in FIG. 2. For example, the chassis 202 may house a processing system (not illustrated) and a non-transitory memory system (not illustrated) that includes instructions that, when executed by the processing system, cause the processing system to provide an unmanned vehicle controller 204 that is configured to perform the functions of the unmanned vehicle controllers or the unmanned vehicles, discussed below. In the specific example illustrated in FIG. 2, the unmanned vehicle controller 204 is configured to provide a risk controller 206 that computationally processes risk scores and risk assessments as well as the functionality discussed below. In the specific example illustrated in FIG. 2, the unmanned vehicle controller 204 is also configured to provide a mobility controller 207 to control the example flight control unit 108 of unmanned vehicle 105 and to implement any control and feedback operations appropriate for interacting with avionics, control actuators, or other equipment included in the flight control unit to navigate the unmanned vehicle 105 illustrated in FIG. 1.

The chassis 202 may further house a communication system 208 that is coupled to the unmanned vehicle controller 204 (e.g., via a coupling between the communication system 208 and the processing system). The communication system 208 may include software or instructions that are stored on a computer-readable medium and that allow the unmanned vehicle 200 to send and receive information through the communication networks discussed above. For example, the communication system 208 may include a communication interface 210 to provide for communications through the communication network 135 as detailed above (e.g., first (e.g., long-range) transceiver(s)). In an embodiment, the communication interface 210 may be a wireless antenna that is configured to provide communications with IEEE 802.11 protocols (Wi-Fi), cellular communications, satellite communications, other microwave radio communications or communications. The communication system 208 may also include a communication interface 212 that is configured to provide direct communication with other unmanned vehicles, a docking station, sensors, the remote monitor 120, or other devices within the environment 102 discussed above with respect to FIG. 1 (e.g., second (e.g., short-range) transceiver(s)). For example, the communication interface 212 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 202 may also house a storage system 214 that is coupled to the unmanned vehicle controller 204 through the processing system. The storage system 214 may store navigation paths 216, risk assessments 217, or other information or instructions used to navigate or operate components of the unmanned vehicle 200 based on risk scores or risk assessments 217.

The chassis 202 may also house a sensor system 220 that may be housed in the chassis 202 or provided on the chassis 202. The sensor system 220 may be coupled to the unmanned vehicle controller 204 via the processing system. The sensor system 220 may include one or more sensors that gather sensor data about the unmanned vehicle 200, an environment around the unmanned vehicle 200 or other sensor data that may be apparent to one of skill in the art in possession of the present disclosure. For example, the sensor system 220 may include a positioning system 224 that includes a geolocation sensor (e.g., a global positioning system (GPS) receiver, a real-time kinematic (RTK) GPS receiver, a differential GPS receiver, a Wi-Fi based positioning system (WPS) receiver, an accelerometer, a gyroscope, a compass, an inertial measurement unit (e.g., a six axis IMU) or any other sensor for detecting or calculating orientation, position, or movement); an imaging sensor 222 that may include ultra-wideband sensors, a camera, a depth sensing camera (for example based upon projected structured light, time-of-flight, a lidar sensor, or other approaches), a three-dimensional image capturing camera, an Infrared image capturing camera, an ultraviolet image capturing camera, similar video recorders, or a variety of other image or data capturing devices that may be used to gather visual information from a physical environment 102 surrounding the unmanned vehicle 200); or other sensors such as, but not limited to, a barometric pressure sensor, a beacon sensor, biometric sensors, an actuator, a pressure sensor, a temperature sensor, an RFID reader/writer, an audio sensor, an anemometer, a chemical sensor (e.g., a carbon monoxide sensor), or any other sensor that would be apparent to one of skill in the art in possession of the present disclosure. While a specific unmanned vehicle 200 has been illustrated, one of skill in the art in possession of the present disclosure will recognize that unmanned vehicles (or other devices operating according to the teachings of the present disclosure in a manner similar to that described below for the unmanned vehicle 200) may include a variety of components and/or component configurations for providing conventional computing device functionality, as well as the functionality discussed below, while remaining within the scope of the present disclosure as well.

Figure 3:
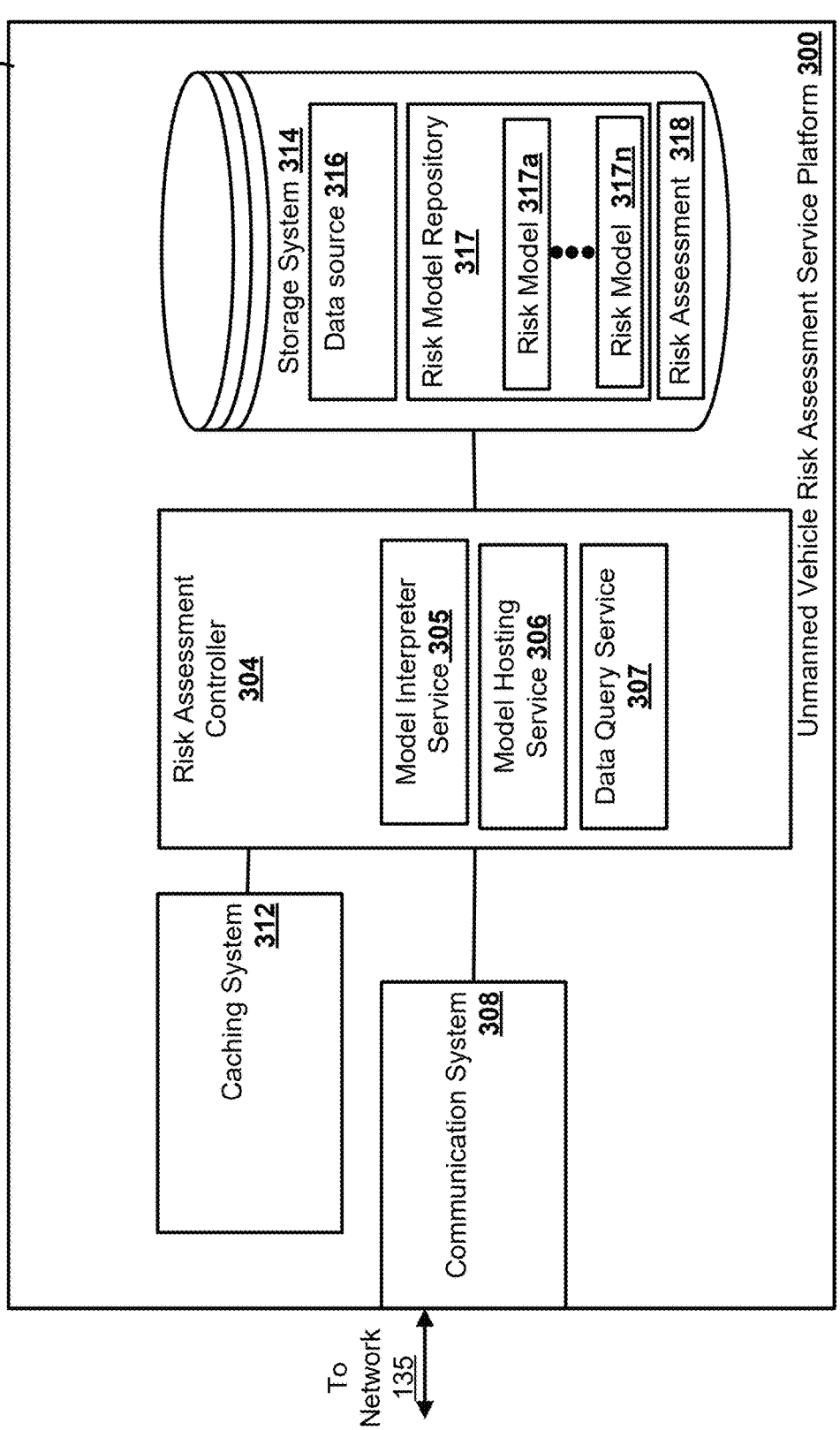
FIG. 3 is a schematic view illustrating an embodiment of an unmanned vehicle risk assessment service platform used in the unmanned vehicle risk assessment system of FIG. 1, in accordance with some embodiments of the present disclosure.

Referring now to FIG. 3, an embodiment of an unmanned vehicle risk assessment service platform 300 is illustrated that may be the unmanned vehicle risk assessment service platform 130 discussed above with reference to FIG. 1. In the illustrated embodiment, the unmanned vehicle risk assessment service platform 300 includes a chassis 302 that houses the components of the unmanned vehicle risk assessment service platform 300, only some of which are illustrated in FIG. 3. For example, the chassis 302 may house a processing system (not illustrated) and a non-transitory memory system (not illustrated) that includes instructions that, when executed by the processing system, cause the processing system to provide a risk assessment controller 304 that is configured to perform the functions of the risk assessment controllers or unmanned vehicle risk assessment service platforms discussed below. In the specific example illustrated in FIG. 3, the risk assessment controller 304 is configured to provide a risk-based trajectory application programming interface (API) described above. The risk assessment controller 304 may include a model interpreter service 305 that is configured to perform the functions of the model interpreter services discussed herein. In various embodiments, the model interpreter service 305 may interpret a specified risk model against integrated contextual data, calculates or splits a navigation path into risk-based segments, calculates risk for a specified set of geospatial points, creates a risk topography or risk assessment, or any other functionality discussed herein. The risk assessment controller 304 may include a model hosting service 306 that is configured to perform the functions of the model hosting services discussed below. In various embodiments, the model hosting service 306 may generate risk models, track risk models, manage risk models, or any other functionality discussed herein. The risk assessment controller 304 may also include a data query service 307 that is configured to perform the functions of the data query services discussed below. In various embodiments, the data query service 307 may retrieve contextual data and other data from remote or local data sources, processes and structures the contextual data into a format for ingestion of risk models or any other functionality discussed herein.

The chassis 302 may further house a caching system 312. As an example, and not by way of limitation, to execute instructions, a risk assessment controller 304 may retrieve (or fetch) instructions from an internal register, an internal cache, a memory, or storage system 314; decode and execute them; and then write one or more results to an internal register, an internal cache, memory, or storage system 314. In particular embodiments, the risk assessment controller 304 may include one or more internal caches for data, instructions, or addresses. This disclosure contemplates a processor that provides the risk assessment controller 304 to include the caching system 312 that may include any suitable number of any suitable internal caches, where appropriate. As an example, and not by way of limitation, that caching system 312 may include one or more instruction caches, one or more data caches, and one or more translation lookaside buffers (TLBs). Instructions in the instruction caches may be copies of instructions in memory or storage system 314 and the instruction caches may speed up retrieval of those instructions by the risk assessment controller 304. Data in the data caches may be copies of data in memory or storage system 314 (which may initially be retrieved via the network from an external storage database) for instructions executing at the processor to operate on; the results of previous instructions executed at the processor for access by subsequent instructions executing at the processor, or for writing to memory, or storage system 314; or other suitable database. The data caches may speed up read or write operations by the risk assessment controller 304. The TLBs may speed up virtual-address translations for the risk assessment controller 304. In particular embodiments, the processor providing the risk assessment controller 304 may include one or more internal registers for data, instructions, or addresses. Depending on the embodiment, the processor may include any suitable number of any suitable internal registers, where appropriate. Where appropriate, the processor may include one or more arithmetic logic units (ALUs); be a multi-core processor; include one or more processors; or any other suitable processor. In various embodiments, of the present disclosure, the caching system 312 may cache data from data sources (e.g., remote and locally) or risk models based on a variety of conditions such as, amount of data, demand of the data or risk model, type of navigation path risk assessment being performed (e.g., enroute unmanned vehicles may require faster processing than unmanned vehicles that are stationary or in a holding pattern) or other conditions that would be apparent to one of skill in the art in possession of the present disclosure.

The chassis 302 may further house a communication system 308 that is coupled to the risk assessment controller 304 (e.g., via a coupling between the communication system 308 and the processing system) and that is configured to provide for communication through the communication network 135 as detailed below. The chassis 302 may also house a storage system 314 that is coupled to the risk assessment controller 304 through the processing system and that is configured to store the rules or other data utilized by the risk assessment controller 304 to provide the functionality discussed below. The storage system 314 may store one or more data sources 316 for contextual data, a risk model repository 317 that includes one or more risk models 317a-n that uses the contextual data to generate one or more risk assessments 318 that may include a risk score, risk metrics, risk-based navigation path segments, or updated navigation path recommendations. While a specific unmanned vehicle risk assessment service platform 300 has been illustrated, one of skill in the art in possession of the present disclosure will recognize that other risk assessment service platforms (or other devices operating according to the teachings of the present disclosure in a manner similar to that described below for the unmanned vehicle risk assessment service platform 300) may include a variety of components and/or component configurations for providing conventional computing device functionality, as well as the functionality discussed below, while remaining within the scope of the present disclosure as well.

Figure 4:
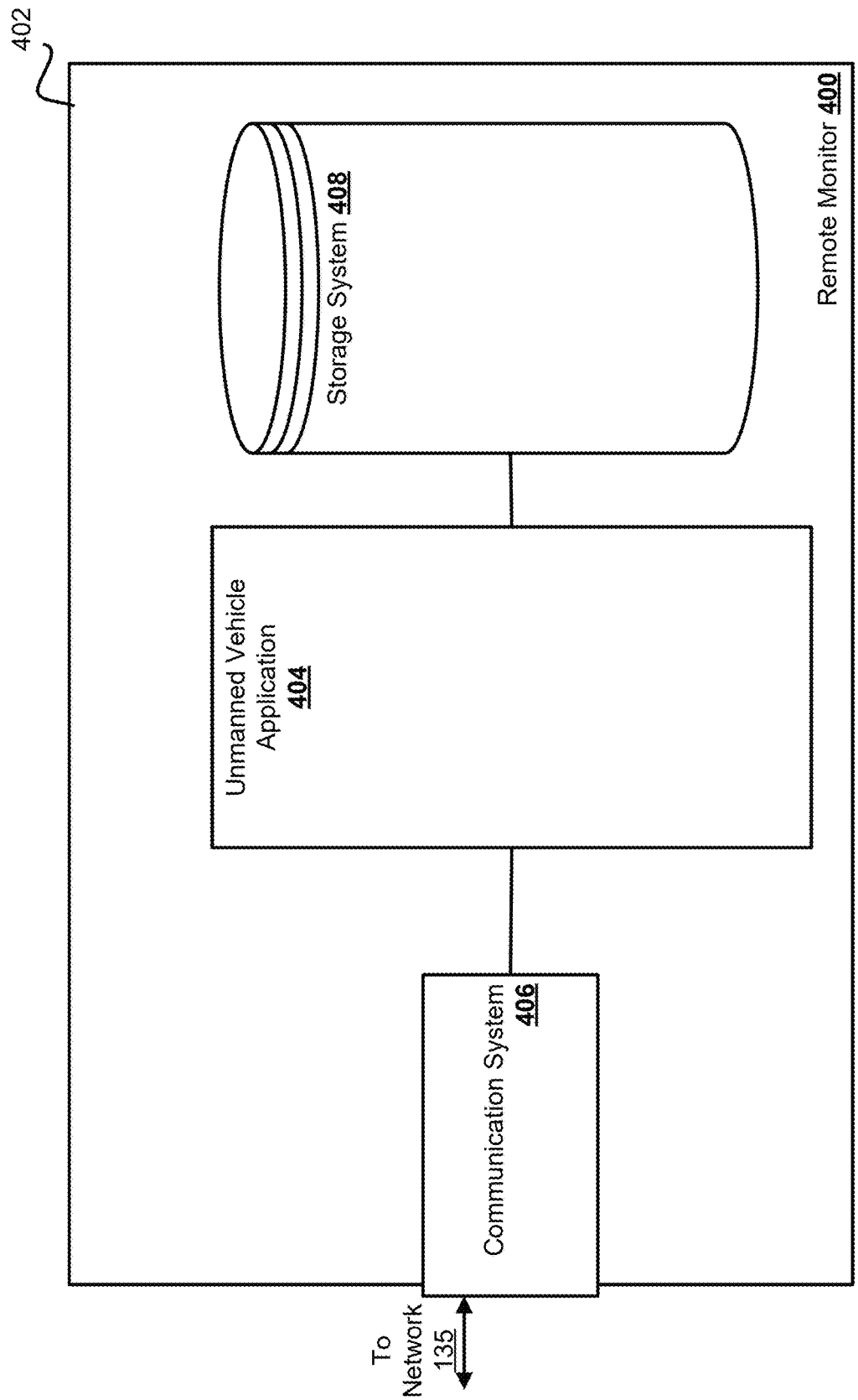
FIG. 4 is a schematic view illustrating an embodiment of a remote monitor used in the unmanned vehicle risk assessment system of FIG. 1, in accordance with some embodiments of the present disclosure.

Referring now to FIG. 4 an embodiment of a remote monitor 400 is illustrated that may be the remote monitor 120 discussed above with reference to FIG. 1. In the illustrated embodiment, the remote monitor 400 includes a chassis 402 that houses the components of the remote monitor 400. Several of these components are illustrated in FIG. 4. For example, the chassis 402 may house a processing system (not illustrated) and a non-transitory memory system (not illustrated) that includes instructions that, when executed by the processing system, cause the processing system to provide an unmanned vehicle application 404 that is configured to perform the functions of the unmanned vehicle applications, unmanned vehicle applications, or remote monitors discussed below. In the specific example illustrated in FIG. 4, the unmanned vehicle application 404 is configured to receive notifications from an unmanned vehicle that include audio feeds and video feeds, provide those notifications to a user through an application, receive instructions from the user through the application, and provide those instructions over a communication network (e.g., the communication network 135) to unmanned vehicles as well as the functionality discussed below.

The chassis 402 may further house a communication system 406 that is coupled to the unmanned vehicle application 404 (e.g., via a coupling between the communication system 406 and the processing system) and that is configured to provide for communication through the network as detailed below. The communication system 406 may allow the remote monitor 400 to send and receive information over the communication network 135 of FIG. 1. The chassis 402 may also house a storage system 408 that is coupled to the unmanned vehicle application 404 through the processing system that is configured to store the rules, graphics, or other data utilized by the unmanned vehicle application 404 to provide the functionality discussed below. While the storage system 408 has been illustrated as housed in the chassis 402 of the remote monitor 400, one of skill in the art will recognize that the storage system 408 may be connected to the unmanned vehicle application 404 through the communication network 135 via the communication system 406 without departing from the scope of the present disclosure. While a remote monitor 400 has been illustrated, one of skill in the art in possession of the present disclosure will recognize that other remote monitors (or other devices operating according to the teachings of the present disclosure in a manner similar to that described below for the remote monitor 400) may include a variety of components and/or component configurations for providing conventional computing device functionality, as well as the functionality discussed below, while remaining within the scope of the present disclosure as well.

Figure 5:
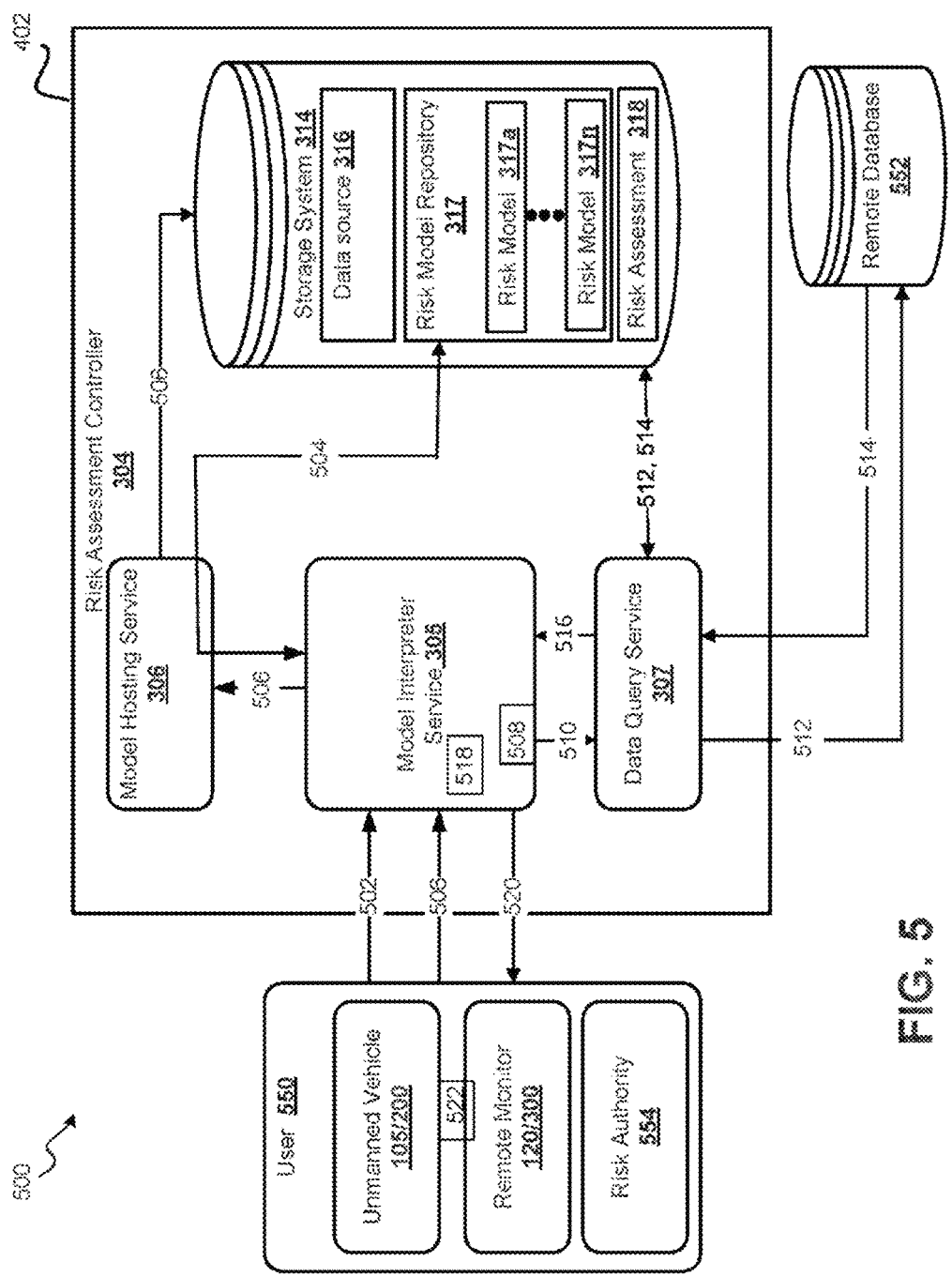
FIG. 5 is a data flow diagram illustrating an embodiment of a method of unmanned vehicle risk assessment, in accordance with some embodiments of the present disclosure.

FIG. 5 depicts an embodiment of a method 500 of scenario injection, which in some embodiments may be implemented with at least some of the components of FIGS. 1, 2, 3 and 4 discussed above. As discussed below, some embodiments make technological improvements to unmanned vehicles and improvements to risk assessment for unmanned vehicles and unmanned vehicle navigation. The method 500 is described as being performed by the risk assessment controller 304 included on the unmanned vehicle risk assessment unmanned vehicle risk assessment service platform 130/300. Furthermore, it is contemplated that the unmanned vehicle 105/200 or the remote platform 120/400 may include some or all the functionality of the risk assessment controller 304. As such, some or all of the steps of the method 500 may be performed by the unmanned vehicle 105/200 or the remote platform 120/400 and still fall under the scope of the present disclosure. For example, the unmanned vehicle risk assessment service platform 300 may provide a risk model to the unmanned vehicle 105/200 for the unmanned vehicle 105/200 to run the risk model and obtain data for the risk model. Furthermore, and as mentioned above, the unmanned vehicle risk assessment unmanned vehicle risk assessment service platform 130/300 may include one or more processors or one or more servers, and thus the method 500 may be distributed across the those one or more processors or the one or more servers.

The method 500 begins at operation 502 where a navigation path risk request is received where the navigation path risk request includes navigation path information associated with a navigation path for an unmanned vehicle through an environment. In an embodiment, at operation 502, a user 550 may provide the navigation path risk request to the unmanned vehicle risk assessment service platform 300. In various embodiments, the navigation path risk request may be received by the model interpreter service 305 (e.g., by interacting with the API on the model interpreter service 305). The navigation path risk request may include navigation path information that may include a navigation path (e.g., a flight path), a trajectory, a time of operation of the unmanned vehicle 105/200, a location or locations of the navigation path, characteristics of the unmanned vehicle 105/200 (e.g., model, type, vehicle identification), or other operational characteristics associated with the unmanned vehicle 105/200 that would be apparent to one of skill in the art in possession of the present disclosure. In various embodiments, the navigation path information may also include information associated with the user 550 that is making the request as well (e.g., a user identifier). The user 550 may include the unmanned vehicle 105/200, the remote monitor 120/400, a third-party computing system (e.g., a computing device associated with a flight controller, an insurance company, a flight manager, a software tools developer, or any other third-party that would want risk assessed for a particular unmanned vehicle or operation of unmanned vehicles in a particular location), or any other user that would be apparent to one of skill in the art in possession of the present disclosure.

In various embodiments, the navigation path information may include a plurality of navigation path segments that are defined two or more vectors. For example, each navigation path segment may include points in the environment 102 that are each defined by longitude and latitude; a volume in the environment 102 that is defined by longitude, latitude, and altitude; a time vector in combination with the point or volume, or any other vector that would be apparent to one of skill in the art in possession of the present disclosure. In some embodiments, navigation path information includes a set of defined geospatial-geotemporal points (e.g., one or more geospatial-geotemporal points) that define path segments. In some embodiments, the model interpreter service 305 may perform the segmenting of the navigation path. Each navigation path segment may include its own set of navigation path information. However, it is contemplated that the unmanned vehicle 105/200 or the remote monitor 120/400 may perform the segmenting of the navigation path prior to providing the navigation path request.

The method 500 may then proceed to operation 504 where a risk model is selected from a plurality risk models based on the navigation path information. In an embodiment, at operation 504, the model interpreter service 305 may select a risk model (e.g., any of the risk models 317a-317n, or any other risk model in the risk model repository 317). The risk model may be selected based on the navigation path information received. For example, the user identifier may be used to identify a particular risk model for a particular user. In other examples, a risk model may be selected based on a location of the navigation path. In other examples, a risk model may be selected based on a type or a make of the unmanned vehicle 105/200, the jurisdiction of the environment specified in 102, or any combination of the information provided in the navigation path information received in the navigation path risk request. As illustrated in FIG. 5, operation 504 may include querying the risk model repository 317 included in the storage system 314 and retrieving the risk model from the risk model repository 317 based on the navigation path information.

In some embodiments, a risk model may be selected for each navigation path segment of the navigation path based on the set of navigation path information for each navigation path segment. As such, for each navigation path provided to the model interpreter service 305, one or more risk models may be selected and each navigation path segment may be analyzed individually based on its corresponding selected risk model, as discussed further below.

In various embodiments, prior, during, or subsequent to the method 500 and represented in operation 506, the risk model A and up to the risk model N may have been provided by a risk authority 554 to the model interpreter service 305. However, it is contemplated that any of the users 550 may be considered a "risk authority" or provide a risk model to the model interpreter service 305. The risk authority 554 may include a researcher, a regulator, a university, an insurance company, or any other individual expert or trusted entity. The risk model may then be stored via the model hosting service 306 in the risk model repository 317 provided by the storage system 314.

The risk models 317a-317n may include a variety of risk models. For example, the risk models 317a-317n may include a Bayesian belief network that determines a likelihood of bad outcomes, severity of bad outcomes, risk factors or any other probabilistic result. As such, the risk models 317a-317n may include root nodes that are not dependent on any other state/node and that have a probability distribution based on prior probabilities given prior knowledge/beliefs, intermediate nodes that are proximate causes of outcomes and conditional dependent on other events that are represented in conditional probability tables, and terminal nodes where the probabilities of these events are outputs of the network and provided by conditional probability tables.

Figure 6A:
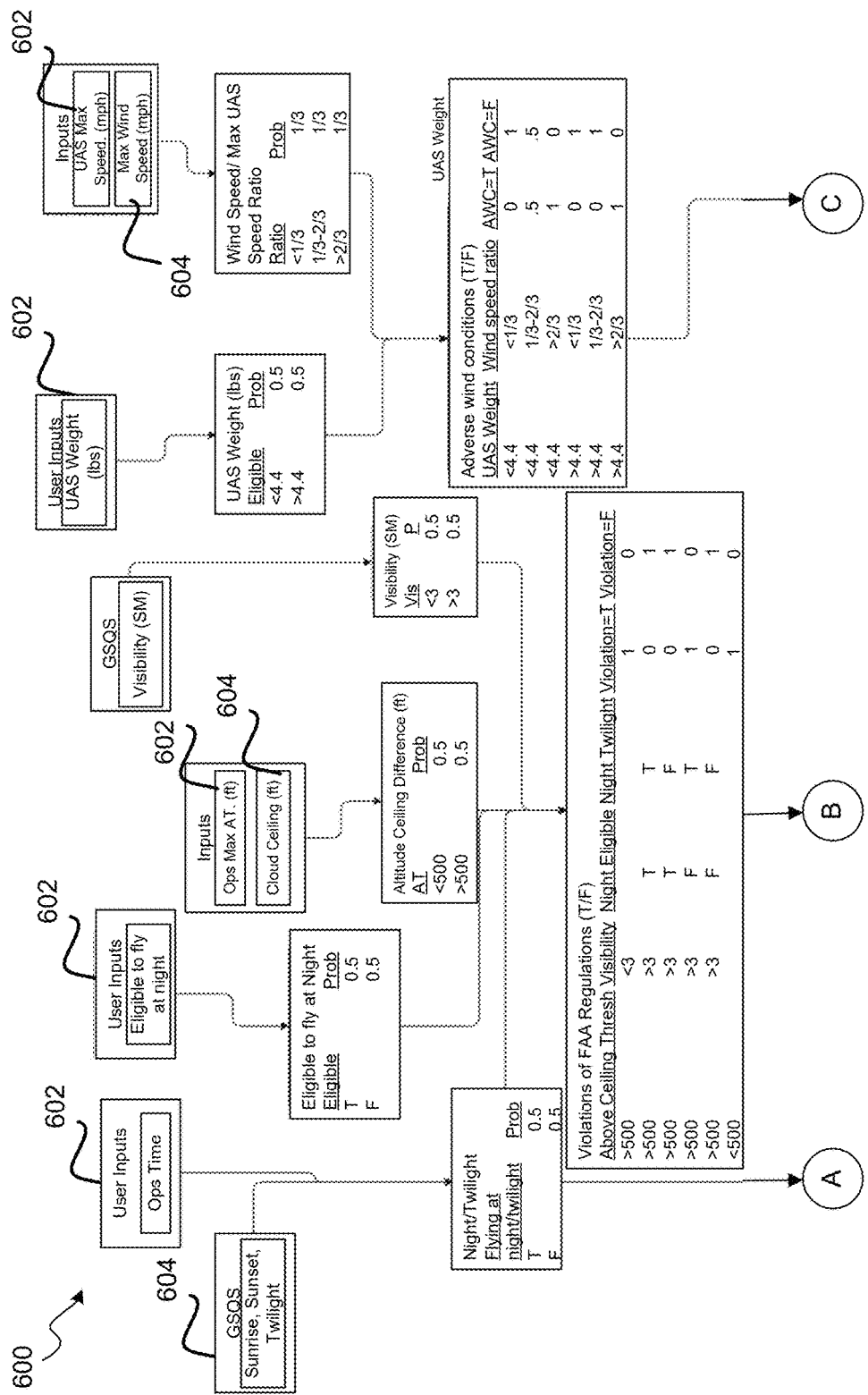
FIGS. 6A-6B illustrate an example of a risk model used during the method of FIG. 5, in accordance with some embodiments of the present disclosure.
Figure 6B:
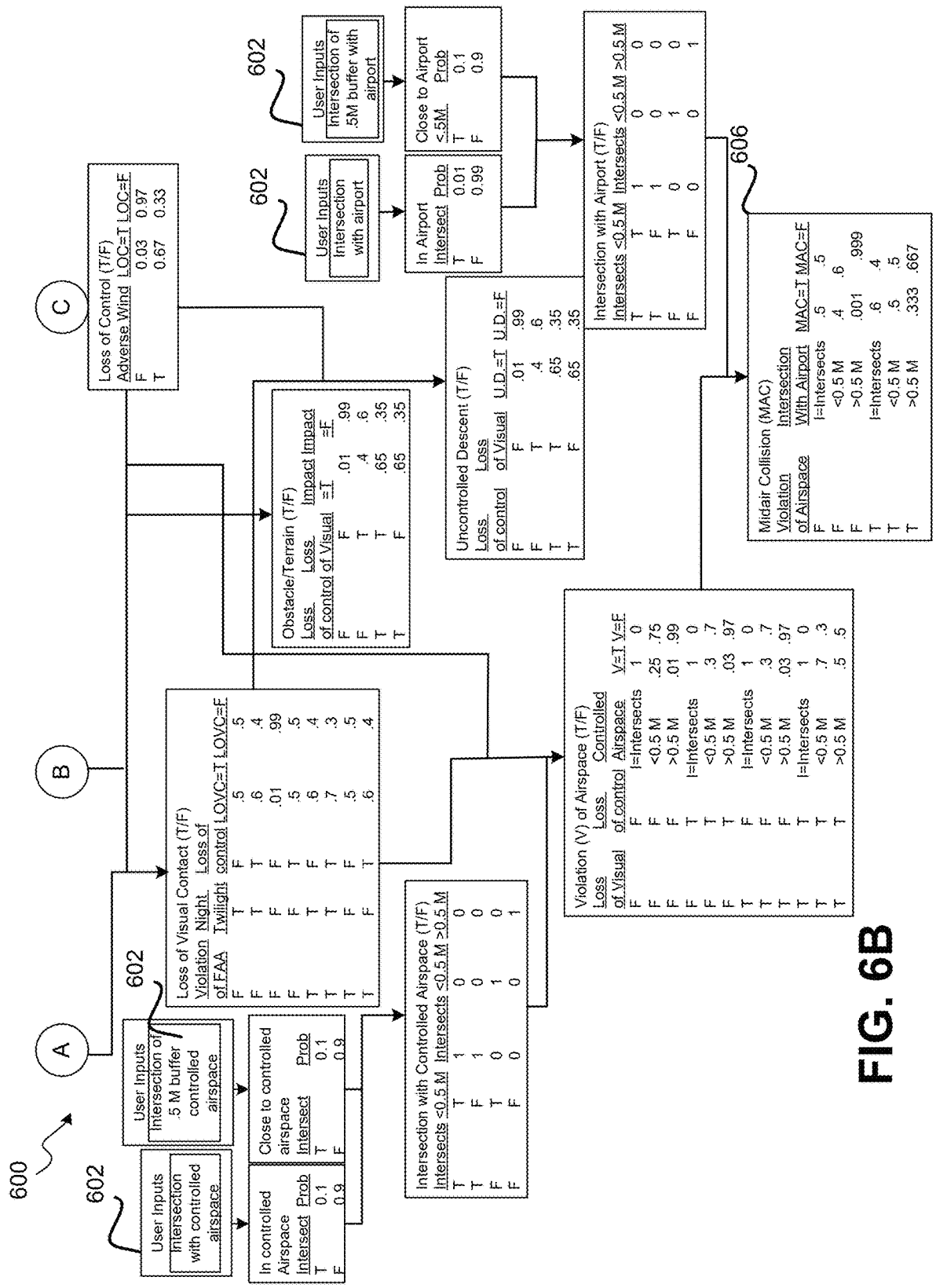
Figure 7A:
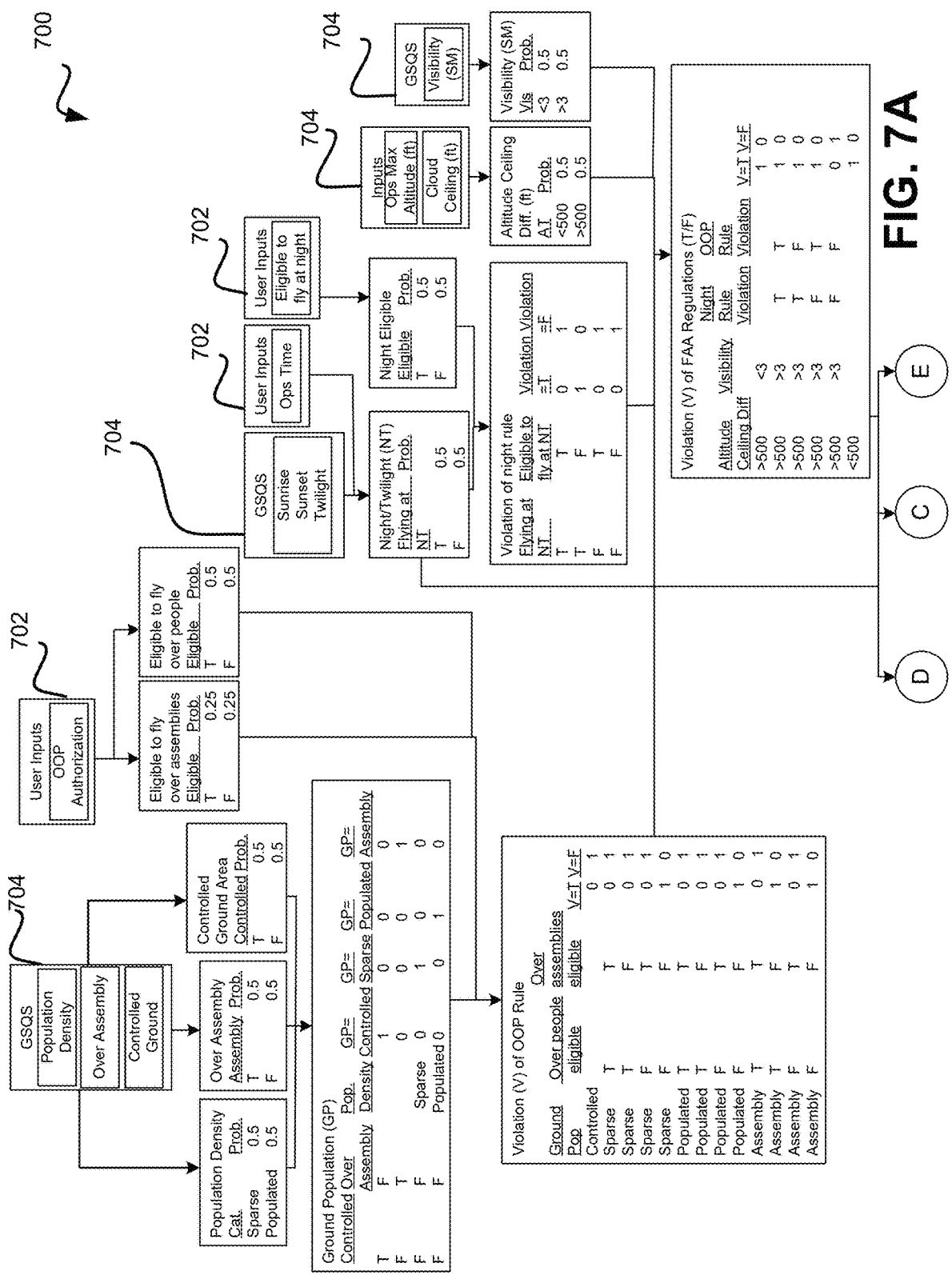
FIGS. 7A-7E illustrate an example of a risk model used during the method of FIG. 5, in accordance with some embodiments of the present disclosure.
Figure 7B:
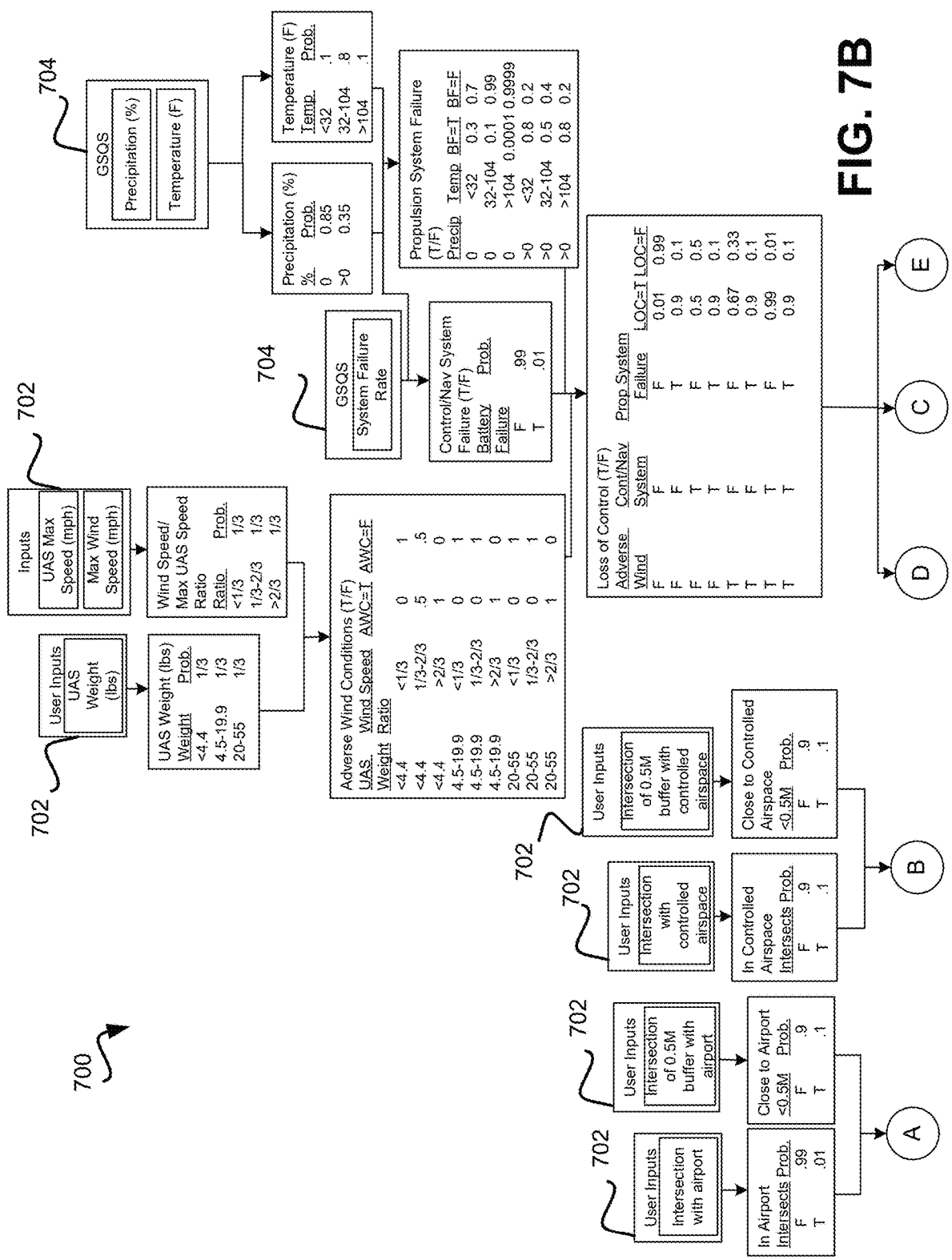
Figure 7C:
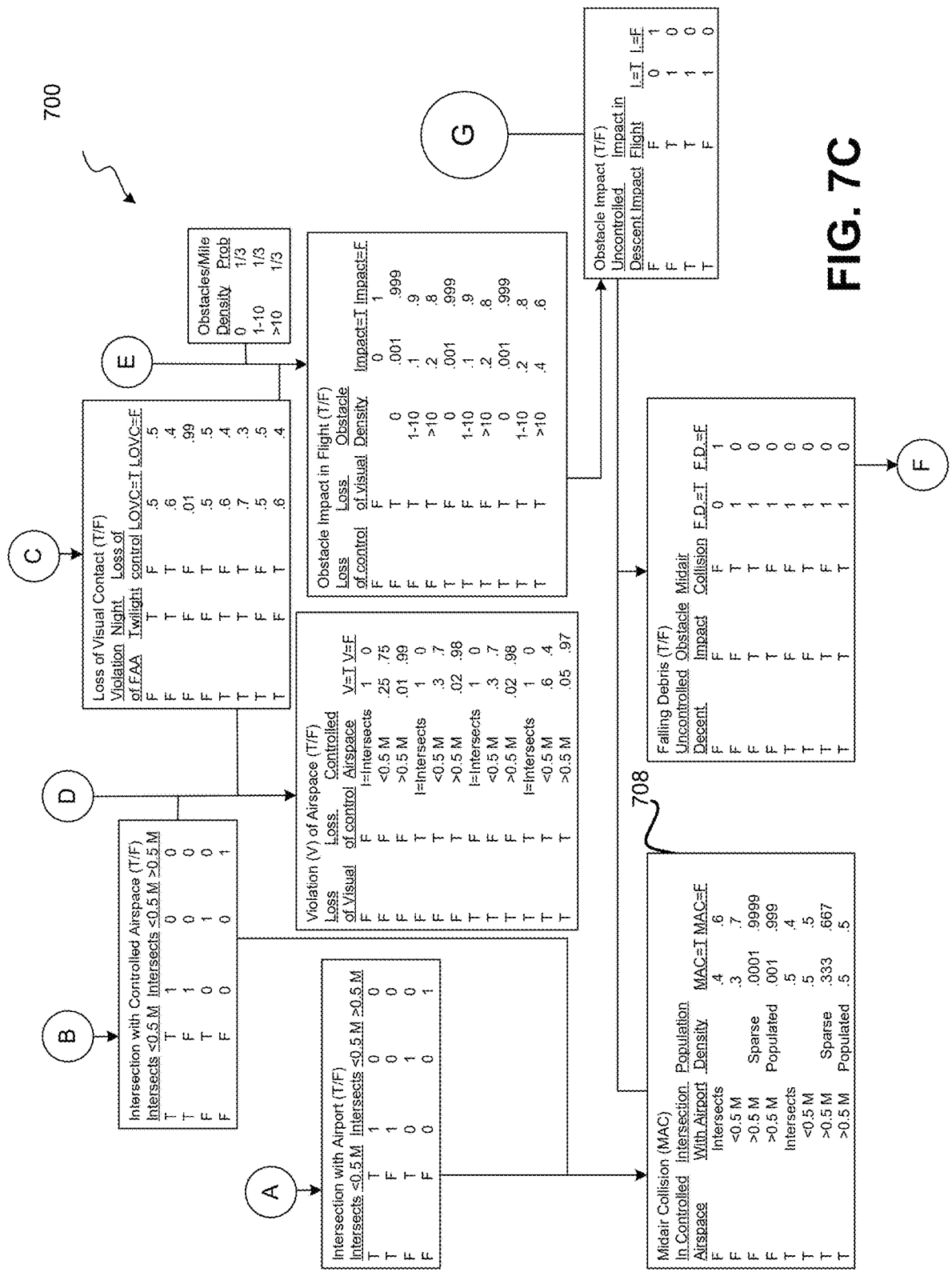
Figure 7D:
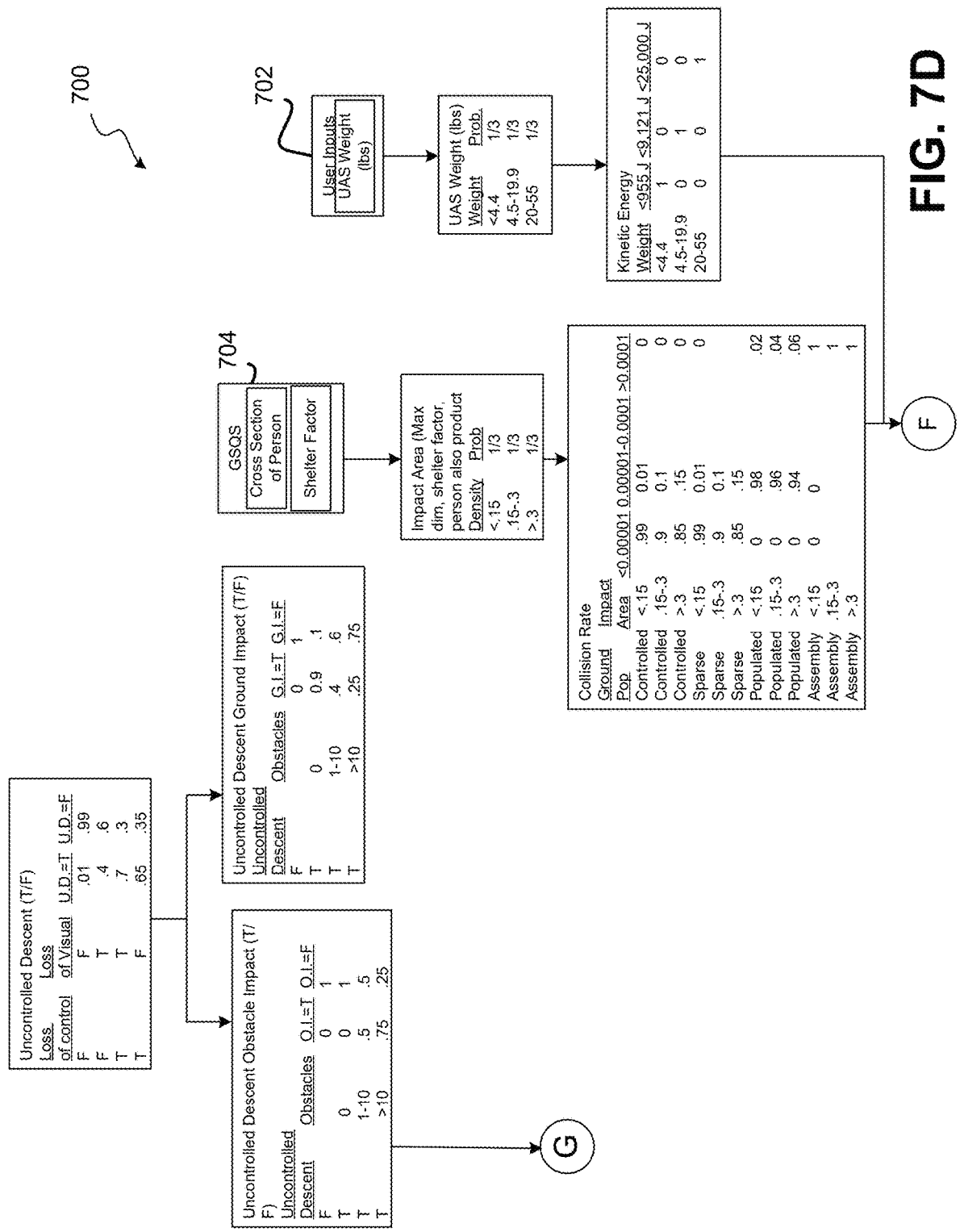
Figure 7E:
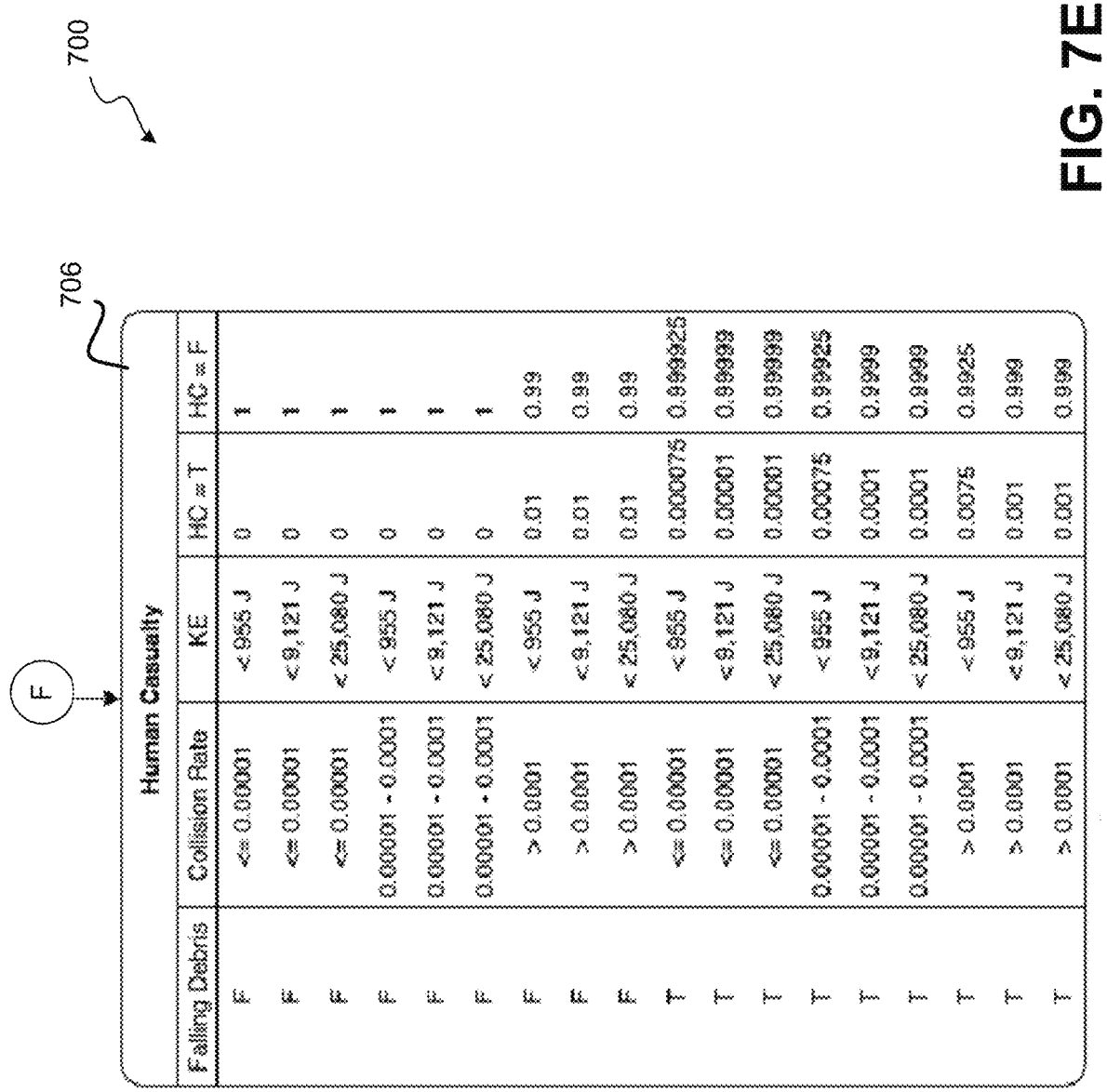

The root nodes may ingest data from the navigation path information or from data sources local or remote to the unmanned vehicle risk assessment service platform 300. The terminal nodes may output a risk metric. FIGS. 6A and 6B illustrate an example risk model 600. The risk model 600 may include an FAA FRAT risk model. The risk model 600 may include a plurality of navigation path information inputs 602 that require inputs provided by the navigation path information. The risk model 600 may provide a plurality of data source information inputs 604. The inputs may be used to calculate a probability of a midair collision in the terminal node 606. FIGS. 7A-7E illustrate another example risk model 700. The risk model 700 may include a JARUS SORA risk model. The risk model 700 may include a plurality of navigation path information inputs 702 that require inputs provided by the navigation path information. The risk model 700 may also provide a plurality of data source information inputs 704. The inputs may be used to calculate a probability of human casualty in the terminal node 706. While specific examples of risk models 600 and 700 are illustrated, one of skill in the art in possession of the present disclosures will recognize that other conventional or future risk models may be contemplated.

The method 500 may then proceed to operation 508 where data used as one or more inputs to run the risk model is obtained from one or more data sources. In an embodiment, at operation 508, the model interpreter service 305 may determine from the risk model inputs what data is needed to run the selected risk model. The model interpreter service 305 may determine that some data is required from the navigation path information, the local data source 316, the remote caching system 312, or a remote data source such as the remote database 552. When data is needed from the remote database 552 or the data source 316, the model interpreter service 305 may provide a relevant operational characteristics request 510 to the data query service 307. The data query service 307 may forward, at 512, that relevant operation characteristics request to the remote database 552 or data source 316. That request may be provided to each data source (e.g., remote or local) that provides the data. At 514, the contextual data requested may be returned to the data query service 307 and provided to the model interpreter service 305 at 516, e.g., subsequent to the normalization of the source data by the data query service 307 subject to normalization requirements as specified in risk models 317a-317n in the system.

In some embodiments, the remote data source provided by one or more remote databases 552 or the data source 316 may include a weather data source, a civil twilight data source, a population density data source, a UAS facility map and class airspace data source, a national security UAS flight restricted areas/special use airspace data source, an infrastructure data source (e.g., natural area preserves, state parks, wildlife management areas, bridges, cell towers, ground hazards, correctional facilities), an FAA obstacle data source, a unmanned vehicle profile (e.g., weight, max speed, range, etc.) data source, or any other data source that would be apparent to one of skill in the art in possession of the present disclosure.

In some embodiments, portions of the risk model may be selected based on a risk metric being determined. For example, and with reference to FIG. 7C, the risk metric being sought for the navigation path risk request may be a likelihood of a midair collision in node 708. As such, the systems and methods of the present disclosure can reduce the computational complexity and computer resource intensive operations of conventional systems that would require a full model and data for the full model to be present. Due to the on-demand/swappable nature of the risk models 317a-317n in the system, only data and portions of risk models that are required to satisfy the navigation path risk assessment request are obtained and processed. This lowers the storage and processing footprint of the system and even allows the risk model to be operated by devices such as the unmanned vehicle 105 or remote monitor 120 that would otherwise likely not have the storage, processing, or networking resources to store, operate, and obtain data and risk models.

Figure 8:
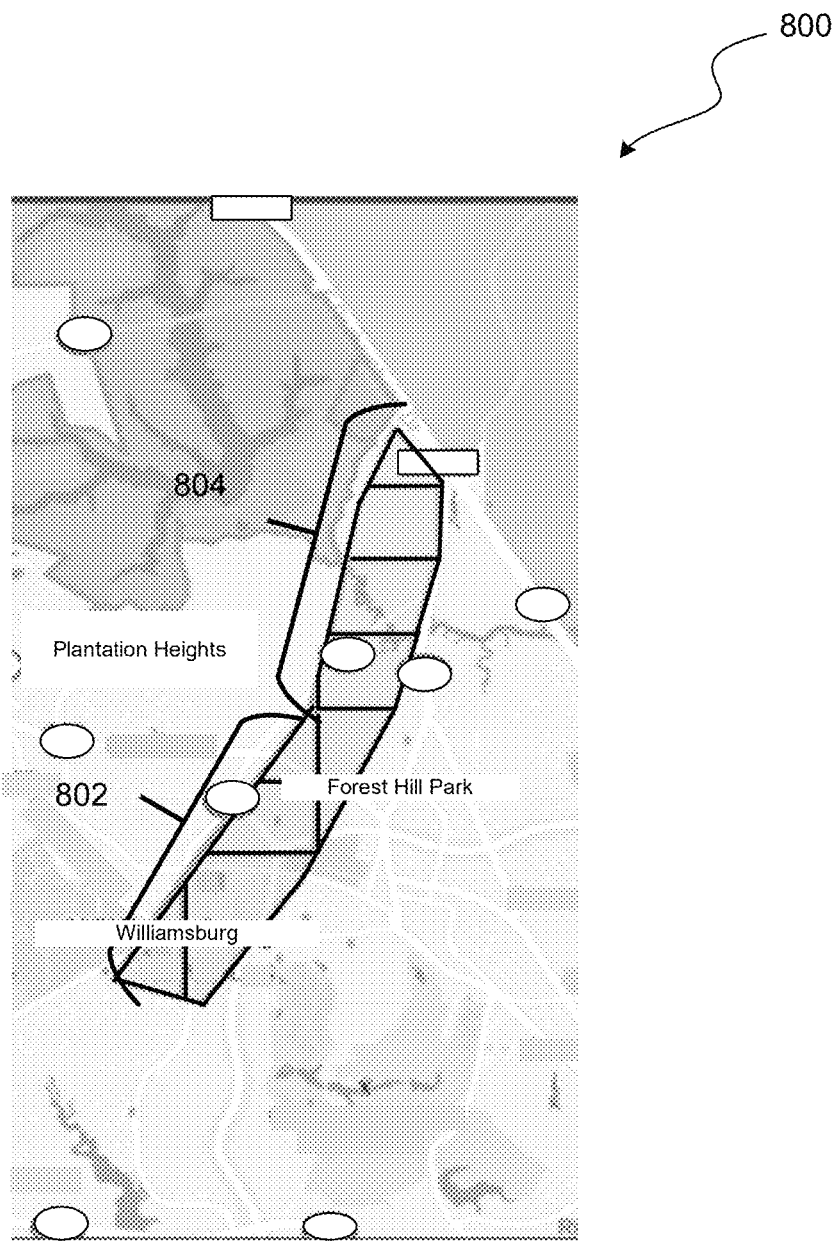
FIG. 8 illustrates an example graphical user interface of a risk assessment generated during the method of FIG. 5, in accordance with some embodiments of the present disclosure.

The method 500 may then proceed to operation 518 where the risk model is operated with the data to output a risk assessment. In an embodiment, at operation 518, the model interpreter service 305 may operate the risk model or the portion of the risk model identified and obtained with the data obtained from the various data sources (e.g., the navigation path information, data from the remote database 552, cached data, or the data from the local data source 316). A risk metric may be outputted by operating the risk model. The risk model or risk models may be operated for each navigation path segment of the navigation path and a risk metric may be outputted for that navigation path segment. The risk metrics may be combined or aggregated in a risk assessment which may include an overall risk score/metric or a navigation path map or a graphical user interface indicating the risk metric for each navigation path segment or one or more points along the navigational path segments. FIG. 8 illustrates an example navigation path map graphical user interface 800 that includes segments 802 that are associated with a low-risk metric and segments 804 that are associated with a medium-risk metric that indicates higher risk than the low-risk metric.

The method 500 may then proceed to operation 520 where a navigation path risk response is provided in response to the navigation path risk request that includes the risk assessment that is associated with at least a portion of the navigation path. In an embodiment, at operation 520, the model interpreter service 305 may provide a navigation path risk response to the user 550 that made the navigation path risk request. However, in other embodiments, the model interpreter service 305 may provide the navigation path risk response to another user device. In yet other embodiments, the model interpreter service 305 may include logic to determine instructions or recommendations based on the risk assessment and provide the instructions or recommendations to the user 550 in the navigation path risk response. For example, the model interpreter service 305 may determine one or more alternative navigation paths/routes through the environment 102 that are less risky and provide those alternative paths to the user 550.

The method 500 may then proceed to operation 522 where an action is performed based on the received navigation path risk response. In an embodiment, at operation 522, the user 550 (e.g., the unmanned vehicle controller 204 of the unmanned vehicle 200 or the unmanned vehicle application 404 of the remote monitor 400) may use a risk assessment, a risk metric, a recommendation, an instruction, or any other data provided in the navigation path risk response to perform an action such as determining whether a risk condition is satisfied and performing an action associated with that risk condition. For example, if a risk condition is satisfied, the unmanned vehicle 105/200 may perform an operational change. In some embodiments, the operational change may be in relation to navigation instructions associated with the navigation path if the risk metric satisfies a risk metric condition. In a specific example, the operational change may include a change in velocity of the unmanned vehicle 105/200, ceasing operation of the unmanned vehicle 105/200, changing the altitude of the unmanned vehicle 105/200, operation of an instrument on the payload unit 110, activating or initiating the navigation path, changing the trajectory of the unmanned vehicle 105/200 such that the unmanned vehicle follows an updated navigation path, or any other operational change that would be apparent to one of skill in the art in possession of the present disclosure.

Figure 9:
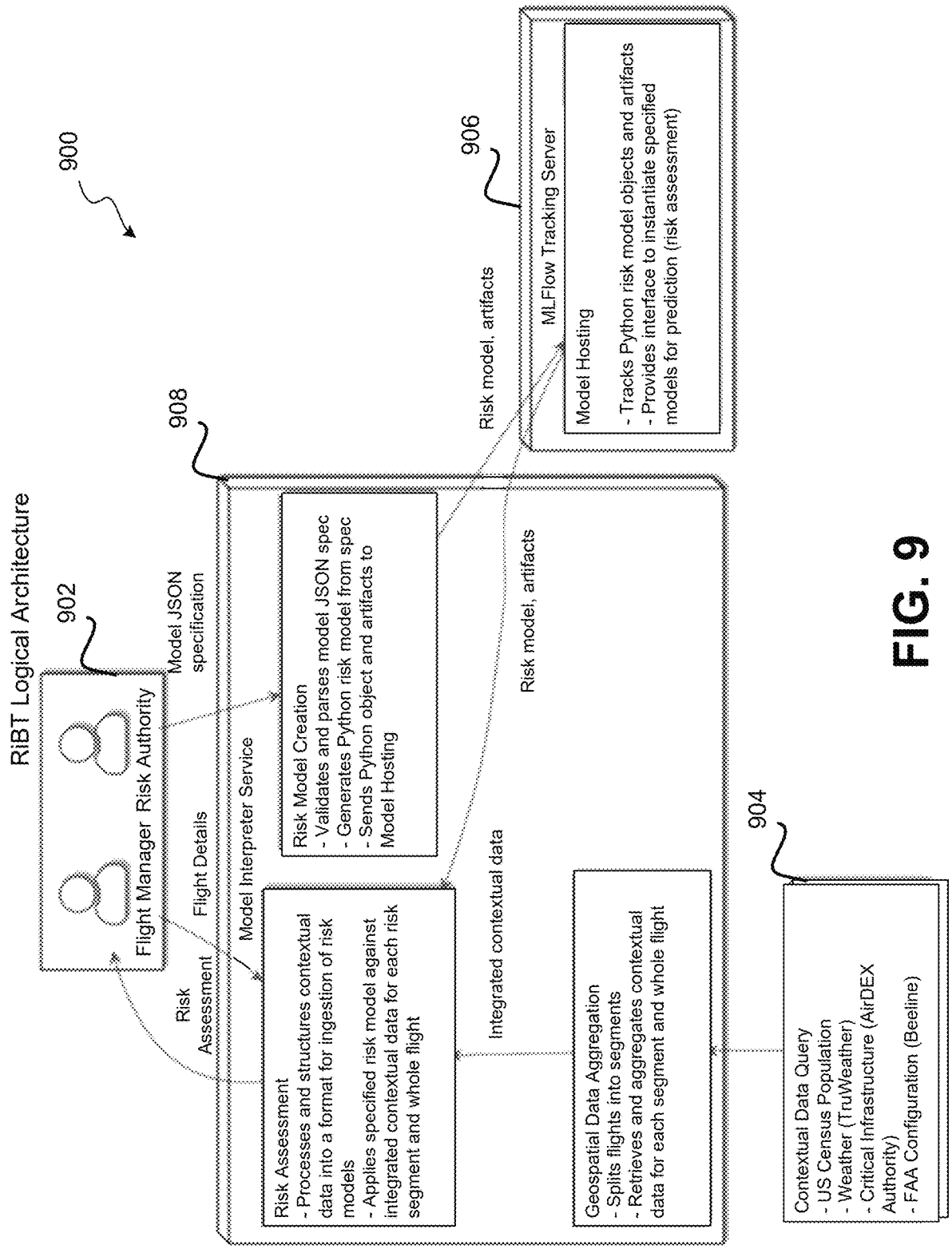
FIG. 9 illustrates an example unmanned aerial vehicle risk assessment logical architecture of the method of FIG. 5, in accordance with some embodiments of the present disclosure.

FIG. 9 illustrates a specific example of a logical architecture 900 for the unmanned vehicle risk assessment system 100 and the method 500 of unmanned vehicle risk assessment described in FIG. 5. The solution architecture includes, in some embodiments, four groups: the system users/consumers 902, the constituent data sources 904, the model tracking and management server 906, and the Model Interpreter Service 908. As described in FIG. 9, the Risk Authority, in some embodiments, interacts with the API on the Model Interpreter Service to specify and submit a model which is then managed by the model tracking and management server 906 (MLFlow Tracking Server) and rendered available for loading when a risk assessment against a specific flight plan is requested. The Flight Manager, in some embodiments, (e.g., Operator) or Tools Developer (e.g., OEM) submits a flight plan with model specification as a geoJSON object (or other suitable format, such as KML or XML) against the Model Interpreter Service API. Then, the request is, in some embodiments, handled in the Risk Assessment module, which loads the risk model from the Model Hosting module which specification is then used to forward a contextual data request to the Geospatial Data Aggregation module. The Geospatial Data Aggregation, in some embodiments, formulates the individual data request queries to the distributed data services and normalizes the returned data before passing it back to the Risk Assessment module. The Risk Assessment module, in some embodiments then, calculates the risk assessment for the proposed operation and then passes the risk topology back to the Model Interpreter Service API. The API, in some embodiments, segments and packages the risk assessed, segmented operation and returns it to the Flight Manager or Tools developer as a geoJSON (or other suitable format, such as KML or XML).

Thus, systems and methods have been presented that provide for an unmanned vehicle risk assessment system that provides a plurality of risk models that may be swappable depending on the circumstances of an unmanned vehicle risk assessment request. The system may obtain only the data that is necessary to operate the risk mode and lightweight such that the risk assessment can occur in near real-time such that risk assessment can be performed during operation of the unmanned vehicle. As location or other variables as of unmanned vehicle changes, different risk models may be applied to help an operator or the unmanned vehicle to determine risk and make adjustments to the operation of the unmanned vehicle. As such, processing resources, network resources and storage resources are reduced and safety of unmanned vehicles is enhanced thus improving the operation of unmanned vehicles and autonomous vehicles.

FIG. 10 is a diagram that illustrates an exemplary computing system 1000 in accordance with embodiments of the present technique. Various portions of systems and methods described herein, may include or be executed on one or more computer systems similar to computing system 1000. For example, unmanned vehicle 105/200, the unmanned vehicle risk assessment service platform 130/300, or the remote monitor 120/400 may include the computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1001 or data 1002. Program instructions 1001 may be executable by a processor (e.g., one or more of processors 1010a-1010n) to implement one or more embodiments of the present techniques. Instructions 1001 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provide by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A method, comprising: receiving, by a computer system, a first navigation path risk request that includes first navigation path information associated with a first navigation path for a first unmanned vehicle through a first environment; selecting, by the computer system, a first risk model from a plurality of risk models based on the first navigation path information; obtaining, by the computer system, first data used as one or more inputs to run the first risk model from one or more data sources; operating, by the computer system, the first risk model with the first data to output a first risk metric; and providing, by the computer system, a first navigation path risk response in response to the first navigation path risk request that includes the first risk metric that is associated with at least a portion of the first navigation path.

2. The method of embodiment 1, wherein the providing the first navigation path risk response causes the first unmanned vehicle to perform a navigation instruction change in relation to navigation instructions associated with the first navigation path if the first risk metric satisfies a first risk metric condition.

3. The method of any one of embodiments 1 and 2, further comprising: receiving the first risk model from a first risk authority; and receiving a second risk model of the plurality of risk models from a second risk authority.

4. The method of any one of embodiments 1-3, further comprising: caching, by the computer system, the first data on a local memory system; and discarding, by the computer system, the first data from the local memory system in response to a discard condition begin satisfied, wherein the obtaining the first data from the one or more data sources includes obtaining at least a first portion of the first data from the local memory system.

5. The method of embodiment 4, wherein the obtaining the first data from the one or more data sources includes obtaining at least a second portion of the first data over a network from one or more external databases.

6. The method of any one of embodiments 1-5, wherein the obtaining the first data from the one or more data sources includes obtaining at least a portion of the first data over a network from one or more external databases.

7. The method of any one of embodiments 1-6, wherein the first risk metric is associated with a first segment of a plurality of segments of the first navigation path.

8. The method of embodiment 7, wherein first segment information associated with the first segment is included in at least one of the first navigation path information for selecting the first risk model or the first data for operating the first risk model.

9. The method of embodiment 7, further comprising: operating, by the computer system, the first risk model with the first data to output a second risk metric, wherein the second risk metric is associated with a second segment of the first navigation path.

10. The method of embodiment 9, further comprising:
   aggregating, by the computer system, the first risk metric, the second risk metric, and risk metrics for others of the plurality of segments into a navigation path risk metric for the first navigation path.

11. The method of embodiment 7, wherein the first segment is defined by at least two vectors.

12. The method of embodiment 7, wherein the first segment is defined by at least three vectors.

13. The method of embodiment 7, wherein the first segment is defined by at least four vectors.

14. The method of embodiment 13, wherein the at least four vectors include a time vector, an altitude vector, a longitude vector, and a latitude vector.

15. The method of any one of the embodiments 1-14, further comprising: receiving, by the computer system, a second navigation path risk request that includes second navigation path information associated with a second navigation path for a second unmanned vehicle through the first environment; selecting, by the computer system, a second risk model from the plurality of risk models based on the second navigation path information; obtaining, by the computer system, second data used as one or more inputs to run the second risk model from the one or more data sources; operating, by the computer system, the second risk model with the second data to output a second risk metric; and providing, by the computer system, a second navigation path risk response in response to the second navigation path risk request that includes the second risk metric that is associated with at least a portion of the second navigation path.

16. The method of any one of embodiments 1-15, further comprising: receiving, by the computer system, a second navigation path risk request that includes second navigation path information associated with the first navigation path for the first unmanned vehicle through the first environment; selecting, by the computer system, a second risk model from the plurality of risk models based on the second navigation path information; obtaining, by the computer system, second data used as one or more inputs to run the second risk model from the one or more data sources; operating, by the computer system, the second risk model with the second data to output a second risk metric; and providing, by the computer system, a second navigation path risk response in response to the second navigation path risk request that includes the second risk metric that is associated with at least a portion of the first navigation path.

17. The method of any one of embodiments 1-16, further comprising: segmenting, by the computer system, the first navigation path into a first segment and a second segment; selecting, by the computer system, a second risk model from the plurality of risk models based on second segment information for the second segment included in the first navigation path information, wherein the selecting the first risk model from the plurality of risk models is based on first segment information for the first segment included in the first navigation path information; obtaining, by the computer system, second data used as one or more inputs to run the second risk model from the one or more data sources; operating, by the computer system, the second risk model with the second data to output a second risk metric; and providing, by the computer system, in the first navigation path risk response that includes the second risk metric that is associated with the second segment, wherein the first risk metric is associated with the first segment.

18. The method of any one of embodiments 1-17, further comprising: segmenting, by the computer system, the first navigation path into a first segment and a second segment; determining, by the computer system, second data associated with the second segment used as one or more inputs to run a second risk model of the plurality of risk models, wherein the first data is associated with the first segment; obtaining, by the computer system, obtaining, by the computer system, second data used as one or more inputs to run the second risk model from the one or more data sources, wherein the first data is associated with the first segment; operating, by the computer system, the second risk model with the second data to output a second risk metric; and providing, by the computer system, in the first navigation path risk response that includes the second risk metric that is associated with the second segment, wherein the first risk metric is associated with the first segment.

19. The method of any one of embodiments 1-18, wherein the operations further comprise steps for obtaining the first data used as the one or more inputs to run the first risk model from the one or more data sources.

20. A non-transitory, machine-readable medium storing instructions that, when executed by one or more processors, effectuate operations comprising: receiving, by a computer system, a first navigation path risk request that includes first navigation path information associated with a first navigation path for a first unmanned vehicle through a first environment; selecting, by the computer system, a first risk model from a plurality of risk models based on the first navigation path information; obtaining, by the computer system, first data used as one or more inputs to run the first risk model from one or more data sources; operating, by the computer system, the first risk model with the first data to output a first risk metric; and providing, by the computer system, a first navigation path risk response in response to the first navigation path risk request that includes the first risk metric that is associated with at least a portion of the first navigation path.

What is claimed is:

1. A method, comprising:
receiving, by a computer system, a first navigation path risk request that includes first navigation path information associated with a first navigation path for a first unmanned vehicle through a first environment;
segmenting, by the computer system, the first navigation path into a first segment and a second segment;
selecting, by the computer system, a first risk model from a plurality of risk models based on the first navigation path information and based on first segment information for the first segment included in the first navigation path information;
selecting, by the computer system, a second risk model from the plurality of risk models based on second segment information for the second segment included in the first navigation path information,
wherein the second risk model is a different risk model than the first risk model such that the first risk model includes a first set of one or more root nodes, a first set of one or more intermediate nodes, and first set of set of one or more terminal nodes, and the second risk model includes a second set of one or more root nodes, a second set of one or more intermediate nodes, and a second set of one or more terminal nodes, and
wherein at least a portion of the first set of one or more intermediate nodes perform a different process than the second set of one or more intermediate nodes;
obtaining, by the computer system, first data used as one or more inputs to run the first risk model from one or more data sources;
obtaining, by the computer system, second data used as one or more inputs to run the second risk model from the one or more data sources;
operating, by the computer system, the first risk model with the first data to output a first risk metric;
operating, by the computer system, the second risk model with the second data to output a second risk metric;
providing, by the computer system, a first navigation path risk response in response to the first navigation path risk request that includes the first risk metric that is associated with the first segment of the first navigation path and that includes the second risk metric that is associated with the second segment; and
updating, by the computer system and based on the first navigation path risk response, a navigation instruction of the first unmanned vehicle to cause a change in operation of the first unmanned vehicle.

2. The method of claim 1, further comprising:
receiving the first risk model from a first risk authority; and
receiving the second risk model of the plurality of risk models from a second risk authority.

3. The method of claim 1, further comprising:
caching, by the computer system, the first data on a local memory system; and
discarding, by the computer system, the first data from the local memory system in response to a discard condition begin satisfied, wherein the obtaining the first data from the one or more data sources includes obtaining at least a first portion of the first data from the local memory system.

4. The method of claim 3, wherein the obtaining the first data from the one or more data sources includes obtaining at least a second portion of the first data over a network from one or more external databases.

5. The method of claim 1, wherein the obtaining the first data from the one or more data sources includes obtaining at least a portion of the first data over a network from one or more external databases.

6. The method of claim 1, wherein the first segment information associated with the first segment is included in at least one of the first navigation path information for selecting the first risk model or the first data for operating the first risk model.

7. The method of claim 1, further comprising:
aggregating, by the computer system, the first risk metric and the second risk metric into a navigation path risk metric for the first navigation path.

8. The method of claim 1, wherein the first segment is defined by at least two vectors.

9. The method of claim 1, wherein the first segment is defined by at least three vectors.

10. The method of claim 1, wherein the first segment is defined by at least four vectors.

11. The method of claim 10, wherein the at least four vectors include a time vector, an altitude vector, a longitude vector, and a latitude vector.

12. The method of claim 1, further comprising:
receiving, by the computer system, a second navigation path risk request that includes second navigation path information associated with a second navigation path for a second unmanned vehicle through the first environment;
selecting, by the computer system, a third risk model from the plurality of risk models based on the second navigation path information;
obtaining, by the computer system, third data used as one or more inputs to run the third risk model from the one or more data sources;
operating, by the computer system, the third risk model with the third data to output a third risk metric; and
providing, by the computer system, a second navigation path risk response in response to the second navigation path risk request that includes the third risk metric that is associated with at least a portion of the second navigation path.

13. The method of claim 1, further comprising:
receiving, by the computer system, a second navigation path risk request that includes second navigation path information associated with the first navigation path for the first unmanned vehicle through the first environment;
selecting, by the computer system, a third risk model from the plurality of risk models based on the second navigation path information;
obtaining, by the computer system, third data used as one or more inputs to run the third risk model from the one or more data sources;
operating, by the computer system, the third risk model with the third data to output a third risk metric; and
providing, by the computer system, a second navigation path risk response in response to the second navigation path risk request that includes the third risk metric that is associated with at least a portion of the first navigation path.

14. The method of claim 1, further comprising steps for obtaining the first data used as the one or more inputs to run the first risk model from the one or more data sources.

15. The method of claim 1, wherein each of the plurality of risk models are different from each other in that if the same data is inputted into each risk model, each risk model will result in a different output.

16. A non-transitory, machine-readable medium storing instructions that, when executed by one or more processors, effectuate operations comprising:
 receiving, by a computer system, a first navigation path risk request that includes first navigation path information associated with a first navigation path for a first unmanned vehicle through a first environment;
 segmenting, by the computer system, the first navigation path into a first segment and a second segment;
 selecting, by the computer system, a first risk model from a plurality of risk models based on the first navigation path information based on first segment information for the first segment included in the first navigation path information;
 selecting, by the computer system, a second risk model from the plurality of risk models based on second segment information for the second segment included in the first navigation path information, wherein the second risk model is a different risk model than the first risk model such that the first risk model includes a first set of one or more root nodes, a first set of one or more intermediate nodes, and first set of set of one or more terminal nodes, and the second risk model includes a second set of one or more root nodes, a second set of one or more intermediate nodes, and a second set of one or more terminal nodes, and
 wherein at least a portion of the first set of one or more intermediate nodes perform a different process than the second set of one or more intermediate nodes;
 obtaining, by the computer system, first data used as one or more inputs to run the first risk model from one or more data sources;
 obtaining, by the computer system, second data used as one or more inputs to run the second risk model from the one or more data sources;
 operating, by the computer system, the first risk model with the first data to output a first risk metric;
 operating, by the computer system, the second risk model with the second data to output a second risk metric;
 providing, by the computer system, a first navigation path risk response in response to the first navigation path risk request that includes the first risk metric that is associated with the first segment of the first navigation path and that includes the second risk metric that is associated with the second segment; and
 updating, by the computer system and based on the first navigation path risk response, a navigation instruction of the first unmanned vehicle to cause a change in operation of the first unmanned vehicle.

* * * * *